US012017243B2

(12) United States Patent
Greenenko et al.

(10) Patent No.: US 12,017,243 B2
(45) Date of Patent: Jun. 25, 2024

(54) LIQUID DROPLET PRODUCTION APPARATUS

(71) Applicant: TTP plc, Royston (GB)

(72) Inventors: Alon Greenenko, Royston (GB); Robert Gordon Maurice Selby, Royston (GB); David Pooley, Royston (GB)

(73) Assignee: TTP plc, Royston (GB)

( * ) Notice: Subject to any disclaimer, the term of this patent is extended or adjusted under 35 U.S.C. 154(b) by 284 days.

(21) Appl. No.: 17/298,975

(22) PCT Filed: Dec. 3, 2019

(86) PCT No.: PCT/GB2019/053412
§ 371 (c)(1),
(2) Date: Jun. 2, 2021

(87) PCT Pub. No.: WO2020/115467
PCT Pub. Date: Jun. 11, 2020

(65) Prior Publication Data
US 2022/0062942 A1 Mar. 3, 2022

(30) Foreign Application Priority Data
Dec. 3, 2018 (GB) ..................................... 1819718

(51) Int. Cl.
*B05B 17/00* (2006.01)
*B05B 17/06* (2006.01)

(52) U.S. Cl.
CPC ...... *B05B 17/0646* (2013.01); *B05B 17/0653* (2013.01)

(58) Field of Classification Search
CPC ............ B05B 17/0646; B05B 17/0653; B05B 17/0638; B05B 17/0615; B05B 17/0607; B05B 1/02; B05B 15/14; B05B 15/18
(Continued)

(56) References Cited

U.S. PATENT DOCUMENTS 7,472,701 B2 * 1/2009 Pfichner .............. B05B 17/0646 128/200.22
2004/0263567 A1 12/2004 Hess et al.
(Continued)

FOREIGN PATENT DOCUMENTS

DE 102008058725 A1 * 5/2010 ............. A45D 34/00
DE 102008058725 A1 5/2010
(Continued)

OTHER PUBLICATIONS

UK Search Report dated May 23, 2019, 3 pages.
(Continued)

*Primary Examiner* — Christopher R Dandridge
(74) *Attorney, Agent, or Firm* — Rankin, Hill & Clark LLP

(57) ABSTRACT

A liquid droplet production apparatus comprising a perforate membrane and an actuator. The actuator is configured to vibrate the perforate membrane such that a liquid in contact with the perforate membrane during use is caused to pass through at least one aperture of the perforate membrane and to be ejected as liquid droplets from the perforate membrane. The perforate membrane includes one or more stiffening structures for increasing the stiffness of the perforate membrane, the one or more stiffening structures each being defined by a local transverse deformation of the perforate membrane. A removable cartridge, a perforate membrane, an actuator assembly for use in such a liquid droplet delivery apparatus, and a method of manufacturing a perforate membrane for such a liquid droplet apparatus.

17 Claims, 11 Drawing Sheets

(58) Field of Classification Search
USPC .................................................... 239/102.1
See application file for complete search history.

(56) References Cited

U.S. PATENT DOCUMENTS

| | | | | |
|---|---|---|---|---|
| 2005/0224076 | A1 | 10/2005 | Pfichner et al. | |
| 2006/0213503 | A1 | 9/2006 | Borgschulte et al. | |
| 2012/0205468 | A1* | 8/2012 | Hsieh .................. | B05B 17/0646 239/548 |
| 2014/0231539 | A1 | 8/2014 | Hsieh et al. | |
| 2018/0221906 | A1* | 8/2018 | Anzenberger ..... | B23K 26/0622 |
| 2018/0280633 | A1 | 10/2018 | Miller et al. | |
| 2018/0297053 | A1 | 10/2018 | Buckland et al. | |

FOREIGN PATENT DOCUMENTS

| | | | | |
|---|---|---|---|---|
| EP | 0542723 | A2 | 5/1993 | |
| WO | WO-2010069932 | A1 * | 6/2010 | ......... B05B 17/0646 |
| WO | WO-2017064473 | A1 * | 4/2017 | ......... B05B 17/0607 |
| WO | WO-2017137252 | A1 * | 8/2017 | .......... A61M 11/005 |

OTHER PUBLICATIONS

Great Britain Examination Report, Application No. GB1819718.6, dated Jan. 27, 2023, 5 pages.
International Search Report, PCT/GB2019/053412, dated Mar. 13, 2020, 3 pages.

* cited by examiner

LIQUID DROPLET PRODUCTION APPARATUS

The present invention relates to electronic devices in which a vibrating perforate membrane is used to generate liquid droplets. In particular, the present invention relates to a liquid droplet production apparatus including a perforate membrane and an actuator configured to vibrate the perforate membrane such that liquid in contact with the perforate membrane is caused to pass through one or more apertures in the membrane and to be ejected as liquid droplets. The present invention also relates to cartridges and perforate membranes for use in such liquid droplet delivery apparatuses and methods of manufacturing perforate membranes.

Liquid droplet production apparatuses which use vibration to generate liquid droplets are well known in the art and have found use in a wide range of fields including printing, medical drug delivery, the treatment of air (for example fragrance delivery and humidification), and for oral delivery of compounds such as vaccines, for nicotine delivery such as devices similar to e-cigarettes, and for other active compounds. Often it is desirable to use a master-cartridge arrangement in which a master unit having control electronics and a power supply can produce liquid droplets from liquid contained in a replaceable cartridge. In such arrangements, the actuator or the perforate membrane, or both, may form part of the cartridge or the master unit. Where the perforate membrane and the actuator both form part of the cartridge, the cartridge itself can be considered as a liquid droplet production apparatus. Preferably, the perforate membrane forms part of the cartridge, while the actuator forms part of the master unit. In other examples, the liquid droplet production apparatus may comprise an integral fluid reservoir which may be refillable.

International Patent Application Publication No. WO2012/156724 provides a liquid droplet production apparatus having a perforate membrane, a liquid supply, and an actuator which is connected to the membrane by a magnetic force so that the membrane can be vibrated by the actuator to generate and eject liquid droplets. In another example, International Patent Application Publication No. WO2015/004449 provides an electronic nebulizer having a perforate membrane, a liquid supply, and an actuator which is clamped to the membrane by a releasable mechanical coupling means so that liquid is nebulized through the membrane when the actuator vibrates the membrane. In each case, a perforate membrane with a plurality of apertures is used to generate substantially monodispersed droplets from a liquid supply containing a liquid to be aerosolised.

Perforate membranes used in such liquid droplet production apparatuses may have such a single nozzle, for example for dispensing or printing applications in which individual droplets may be dispensed on demand. Typically, a perforate membrane will have a plurality of apertures having the same configuration. That is, the same size, shape, cross-sectional profile and spacing. The configuration of the aperture or apertures is a determining factor on the size of the ejected droplets. For printing applications, the size of the ejected droplets will influence the coating rate and the printing resolution. For medicament delivery or vaping applications, the size of ejected droplets is known to influence the rate of bio-absorption of medicament. It is also known to influence flavour delivery and “mouth feel”. For rapid bio-absorption, or “uptake”, of a medicament, it is beneficial for the droplets to be small enough to be carried in the streamlines of inhaled air for delivery to the lung. Preferably, evaporation into the gaseous phase occurs in the lung. However, if the droplets are too small, evaporation into the gaseous phase may occur before the inhaled air reaches the lung. This can result in a harsh or uncomfortable sensation in the throat, which is known as “catch”. For flavour delivery, flavour constituents in the liquid formulation need to be delivered to taste receptors in the mouth. To reliably deliver flavour to the taste receptors in the mouth, the size of droplets containing flavour constituents benefit from being larger, since larger droplets less readily follow the streamlines of inhaled air and so impact in the mouth rather than continue through the throat and into the lung.

However the aperture or apertures are configured, it is important to achieve a sufficient mass flow rate of droplets for a given application. To successfully generate a droplet, an aperture in the perforate membrane needs to be accelerated above a minimum acceleration threshold, or “ejection threshold”. Generally, the smaller the aperture, the higher the ejection threshold. Typically, the mode of vibration of a perforate membrane in an aerosol delivery system is such that different regions of the membrane vibrate with different amplitudes. This means that the acceleration of the membrane and the fluid pressure generated in those regions can differ. To achieve the desired mass flow rate of droplets, the number of droplet-ejecting apertures or holes must be sufficiently high. This can be challenging for a number of reasons. Firstly, manufacturing membranes with enough apertures, or “holes”, often requires the holes to be spaced close together. For efficient ejection, each hole needs an appropriate geometry which typically requires a larger entry hole than exit hole. In thicker membranes, the necessary size of the larger entry hole is such that it limits how close holes can be. Secondly, forming holes at high spatial densities with the appropriate tapered geometry can be challenging with thicker membranes as laser drilling would require removal of more material, leading to slower processing times or distortion, and electroforming thick membranes requires large photoresist spots that consequently limit the density of holes that can be achieved. Alternative electroform processes such as thick resist methods are more complex to establish. Thinner membranes provide a solution to the manufacturing challenges in achieving high hole densities in thick membranes.

However, thinner membranes typically have lower stiffness and vibrate with higher order vibration modes which limit the area of membrane above the acceleration threshold due to the number of turning points, or nodes, in the vibration pattern in which amplitude or acceleration of the membrane crosses or approaches zero. This can be particularly prevalent at higher actuation frequencies. So, although mass flow rate is proportional to the droplet ejection rate, which in some respects depends on the actuation frequency, increasing actuation frequency in order to increase the mass flow rate can in fact result in a reduced mass flow rate if it leads to a reduction in the number of holes in the perforate membrane which are accelerated above their ejection threshold, despite the fact that the membrane is oscillated at a greater rate.

To resolve these competing requirements, basic actuation modes may be used in which large areas of a membrane oscillate in phase, thus reducing the portion of non-ejecting surface area. The term “basic actuation modes” refers to lower order modes of vibration, such as the first mode of vibration, or “fundamental frequency”, of the perforate membrane in which a greater proportion of the membrane oscillates in phase. These basic actuation modes may be accomplished using a thicker membrane or by vibrating the perforate membrane at lower frequencies. In either method, the mass flow rate may be compromised. Also, with thicker membranes, the formation of the apertures can be more difficult and can increase the amount of viscous losses during ejection, leading to a lower ejection efficiency. Potentially, a higher ejection rate can be achieved in a basic actuation mode with a thinner membrane by increasing the oscillation amplitude. However, this approach is not energy efficient and may damage the actuator.

As an alternative approach, it is known to provide the membrane with a domed shape. By doming the membrane, the basic actuation mode of the perforate membrane is at a higher frequency so that the mass flow rate in the basic actuation mode is increased. In the basic actuation mode, most of the membrane vibrates in phase and amplification of vibration in selected portions of the membrane is possible by frequency tuning, although this does not amplify the vibration substantially and is not always reliable. However, the extent of doming necessary for optimum single order vibration can be beyond the limits for the material and can cause damage or deformation to the holes in the membrane and lead to variations in the directionality of the holes from the forming process. Also, the location of high and low acceleration regions for a given domed membrane can be highly sensitive to variations and tolerance ranges in the manufacturing process. This can make it difficult to predict ejection performance and can make it difficult to ensure that apertures are placed in high velocity regions.

It would be desirable to provide an improved liquid droplet production apparatus.

According to a first aspect of the present invention, there is provided a liquid droplet production apparatus comprising a perforate membrane, and an actuator configured to vibrate the perforate membrane such that a liquid in contact with the perforate membrane during use is caused to pass through at least one aperture of the perforate membrane and to be ejected as liquid droplets from the perforate membrane, wherein the perforate membrane comprises one or more stiffening structures for increasing the stiffness of the perforate membrane, the one or more stiffening structures each being defined by a local transverse deformation of the perforate membrane.

With this arrangement, the frequency of the basic actuation mode can be increased without the need for extensive doming of the membrane. This facilitates an increase in mass flow rate in the basic actuation mode. This means that the mass flow is no longer limited by material strength or by aperture deformation or damage. The presence of one or more stiffening structures can increase the efficiency with which vibrations are transferred from the actuator to the central region of the membrane. In fact, with some arrangements of stiffening structure, it has been found that the vibration of the central portion of the perforate membrane can be amplified by up to ten times the average amplitude of vibration of a conventional domed membrane. The use of one or more stiffening structures defined by transverse deformations in the perforate membrane has been found to provide a simple and controllable manufacturing process that can be less susceptible to variations in performance caused by variations and tolerance ranges during manufacture than for an equivalent doming process.

Furthermore, the amplitude of vibration of different regions of the perforate membrane can be tuned by adjusting the level of deformation of the one or more stiffening structures.

As used herein, the term "transverse" refers to the direction perpendicular to the general plane of the membrane. This generally corresponds to the direction of displacement of the membrane when vibrated by the actuator. The term "local transverse deformation" refers to a permanent distortion or interruption in the primary shape of the perforate membrane in the transverse direction. This type of deformation differs from a simple doming of the membrane, which does not interrupt the primary shape of the membrane but instead defines that primary shape. The term "local" may refer to the deformation of only a small area of the membrane. For example, across less than 50 percent of the active area of the membrane, the active area being the region of the membrane which is not directly coupled to the actuator.

Preferably, the perforate membrane has a domed primary shape. That is, the general overall shape of the perforate membrane is that of a dome. This includes perforate membranes in which the entire membrane is domed as well as membranes having a domed active portion and a substantially planar peripheral portion by which the membrane can be coupled to a planar portion of the actuator, or having a substantially planar central region in which the at least one aperture is provided. Where the perforate membrane has a domed primary shape, the local transverse deformation of each of the one or more stiffening structures forms an interruption to the domed primary shape. The primary shape can be considered as a primary deformation and the stiffening structures as a secondary deformation.

The perforate membrane may have a planar primary shape. In such embodiments, the one or more stiffening structures shorten the average unsupported length and area of the membrane. This facilitates maintenance of low order vibration in the planar regions while at the same time allowing amplification at the centre of each planar region. The planar perforate membrane may comprise a plurality of apertures which are located in one or more planar regions of the membrane. With this arrangement, the one or more stiffening structures can be positioned to increase the structural stiffness of the perforate membrane while avoiding the apertures. This has the particular advantage of allowing the stiffening structure to completely avoid the regions with holes so that the direction of the droplets can be well controlled and the holes are not subject to the strain associated with the forming the stiffening structures.

Preferably, where the perforate membrane has a domed primary shape, the local transverse deformation of at least one of the one or more stiffening structures comprises an indentation in the outer surface of the domed primary shape. That is, one or more indentations in the radially outer surface. This will of course result in one or more protrusions on the radially inner surface. In such embodiments, the transverse deformation extends in the opposite direction to the curvature of the dome. This can advantageously reduce the level of strain exerted on the perforate membrane during formation. It can also reduce the extent to which the stiffening structures obstruct liquid droplets ejected from adjacent holes when compared to transverse deformations extending in the same direction as the dome. This means that it can be possible to place holes closer to the stiffening structures than might otherwise be the case and thereby increase the number of holes in the membrane.

The one or more stiffening structures may comprise one or more protrusions on the outer surface of the domed portion. That is, one or more protrusions on the radially outer surface. This will of course result in one or more indentations in the radially inner surface. In such embodiments, the transverse deformation extends in the same direction as the curvature of the dome.

The one or more stiffening structures may comprise a plurality of local transverse deformations that form indentations in the outer surface of the domed portion, protrusions on the outer surface of the domed portion, or a combination of indentations in and protrusions on the outer surface of the domed portion.

In certain embodiments, the one or more stiffening structures are defined by a plurality of elongate local transverse deformations. The term "elongate" refers to a deformation having a length dimension along the surface of the perforate membrane which is greater than its maximum width dimension. For example, one or more of the elongate transverse deformations may have a length dimension which is at least twice its maximum width.

The plurality of elongate local transverse deformations may be linear, non-linear, or any combination thereof.

The plurality of elongate transverse deformations may extend in any suitable direction. In some embodiments, at least one of the plurality of elongate local transverse deformations extend in a radial direction of the perforate membrane. The plurality of elongate local transverse deformations may extend in a radial direction of the perforate membrane towards the centroid of the perforate membrane. The plurality of elongate local transverse deformations may extend to the centroid of the perforate membrane, or terminate peripherally of the centroid, or any combination thereof.

The plurality of elongate local transverse deformations may be arcuate. The plurality of elongate local transverse deformations may be arcuate and extend in a circumferential direction of the perforate membrane. The arcuate deformations may be annular. The arcuate deformations may be arranged as a plurality of concentric rings around the centroid of the perforate membrane. One or more of the arcuate deformations may extend around only part of the circumference of the perforate membrane.

The one or more stiffening structures may comprise a single elongate transverse deformation. For example, a single annular transverse deformation which extends around the centroid of the perforate membrane.

The one or more stiffening structures may be defined by a local transverse deformation located at the centroid of the perforate membrane. In such embodiments, the central region of the perforate membrane is defined at least in part by the local transverse deformation of the stiffening structure. The local transverse deformation may be centralised at the centroid of the perforate membrane. For example, the perforate membrane may have a domed primary shape and the local transverse deformation may be provided in the form of a central dimple in the middle of the domed primary shape. By adding a central dimple to a domed membrane, uniform motion (first order vibration) can be achieved at one frequency and a higher order vibration can be achieved at a higher drive frequency. By virtue of the stiffening structure this behaviour can be achieved consistently. This has the benefit of allowing switchable behaviour of the membrane changing the stimulation frequency rather than the stimulation amplitude. This provides a more reliable control. The frequencies of the shift can be adjusted by changing the geometry of the membrane.

The perforate membrane may comprise a planar portion in which the centroid of the perforate membrane and the at least one aperture are located. With this arrangement, the one or more stiffening structures are located outside of the planar portion. This has the particular advantage of allowing the stiffening structure to completely avoid the regions with apertures so that the direction of the droplets can be well controlled and the apertures are not subject to the strain associated with the forming the stiffening structure. This has the benefit of shortening the average unsupported length and areas of planar membrane so maintaining a low order vibration in the planar regions while at the same time allowing amplification at the centre of each planar region.

Preferably, the at least one aperture comprises a plurality of apertures.

The plurality of apertures may all extend through the membrane at a direction which is normal to the perforate membrane. With this arrangement, the spray direction of droplets is normal to the surface of the perforate membrane. So where the membrane is domed, the plurality of apertures are each normal to the curvature of the dome at the point on the perforate membrane at which the aperture is located. Thus, the apertures and the resulting ejection direction is angled away from the transverse axis of the membrane. Where the membrane is domed and convex, this arrangement results in a spray which is divergent and has a wider pattern of droplets.

Preferably, at least a first set of the plurality of apertures extend through the thickness of the perforate membrane at an angle to the normal of the perforate membrane. With this arrangement, the direction of ejection from the first set of the plurality of apertures can be tailored independently of the shape of the membrane. Thus, the spot size or spray angle may be adjusted by making the first set of apertures point in a particular direction or directions.

In certain embodiments, the perforate membrane has a domed primary shape and each of the first set of the plurality of apertures is angled towards a transverse axis of the perforate membrane relative to the normal of the perforate membrane. This means that rather than the first set of apertures extending normal to the curvature of the dome, the first set of apertures are 'turned in' towards the transverse axis. This facilitates the production of a smaller spot size or spray angle.

The at least one aperture may comprise a plurality of apertures all having substantially the same configuration. That is, the same size, shape, cross-sectional profile and spacing.

Preferably, the at least one aperture comprises a first array of apertures of a first configuration and a second array of apertures of a second configuration which is different to the first configuration, wherein the first array of apertures are grouped together in a first discrete region of the perforate membrane, and wherein the second array of apertures are grouped together in a second discrete region of the perforate membrane. The at least one aperture may consist only of the first and second arrays of apertures. The at least one aperture may comprise one or more additional arrays of apertures of a different configuration to the first and second arrays of apertures.

By providing a first array of apertures of a first configuration grouped together in a first discrete region of the membrane and a second array of apertures of a second configuration grouped together in a second discrete region of the membrane, the droplets generated by the perforate membrane can have two different size distributions which are generated simultaneously and tuned according to a specific application. For example, the apertures of one of the first and second arrays can be configured to generate droplets having a concentration of droplets of a small size, and the apertures of the other array can be configured to generate a droplets having a concentration of droplets of a larger size. This can enable the resulting aerosol or spray to provide the benefits of both droplet sizes simultaneously. For example, in medicament delivery or vaping applications, mouth feel and flavour delivery can be tuned independently of uptake in the lung and the level of "catch" in the throat.

Furthermore, the provision of apertures of different configurations in different discrete regions can enable the perforate membrane to be tuned according to the characteristics or droplet generation requirements of different liquid formulations. For example, the first array can be optimised for delivery of a first liquid formulation and the apertures of the second array can be optimised for delivery of a second liquid formulation. This can be particularly beneficial where the perforate membrane is used with a fluid reservoir which is configured to contain first and second separate liquid formulations which are delivered to the first and second arrays separately.

Preferably, the first discrete region of the perforate membrane has a first vibration characteristic and the second discrete region has a second vibration characteristic which is different to the first vibration characteristic, such that when the perforate membrane is vibrated by the actuator at a first resonant frequency, the first discrete region vibrates with a first amplitude or acceleration and the second discrete region vibrates in phase with the first discrete region with a second amplitude or acceleration which is less than the first amplitude or acceleration.

Advantageously, this allows droplet generation from the perforate membrane to be tuned according to the vibration characteristics or vibration pattern of the perforate membrane in the first and second discrete regions. For example, where the apertures of the first and second arrays are configured with different sizes, it can be beneficial to place the small apertures, which tend to have a higher ejection threshold, in the discrete region with the greater vibrational activity and to place the large apertures, which tend to have a lower ejection threshold, in the discrete region with the lower vibrational activity. The increased vibrational activity can ensure that a higher percentage of the small apertures are above the ejection threshold to maximise the mass flow of smaller droplets. Similarly, placing the larger apertures in a region of lower vibrational activity can ensure that a higher percentage of the apertures in the less active region are above the ejection threshold. This can increase the utilisation of the membrane and thereby increase the amount of aerosol generated from a given vibrational input and improve the efficiency of the system, all the while allowing for simultaneous generation of flows of droplets of different sizes. For nicotine delivery applications, this enables simultaneous production of a sufficient mass flow of smaller droplets to maximise mass flow into the lung and of larger droplets to deliver flavour.

Preferably, the second vibration characteristic is such that when the perforate membrane is vibrated by the actuator at a second resonant frequency, the second discrete region vibrates at a third amplitude or acceleration which is less than both of the first amplitude or acceleration and the second amplitude or acceleration.

With conventional domed membranes, it is possible to reduce the mass flow of smaller droplet sizes as required by decreasing the amplitude with which the perforate membrane is vibrated by the actuator. In other words, the smaller droplets can be "switched on" or "off" by varying the amplitude of vibration. However, it is not possible to reduce the mass flow of larger droplet sizes by increasing the amplitude of vibration, since this will simply increase the mass flow of all droplet size populations.

However, by configuring the one or more stiffening structures such that, when the perforate membrane is vibrated by the actuator at a second resonant frequency, the second discrete region vibrates at a third amplitude or acceleration which is less than both of the first amplitude or acceleration and the second amplitude or acceleration, the average mass flows of different droplet sizes can be regulated by actuating the perforate membrane at a different driving frequencies. This means that the apertures of the second array may be "switched off" at the second resonant frequency if the third amplitude is below the ejection threshold of the apertures of the second array.

For applications involving spraying or printing of a fluid, it is advantageous to be able to control the width (i.e. cone angle) of a spray plume, the spot size of a printed dot, and/or the edge effect of the spray (either forming a sharp edge or a blended edge). This is particularly relevant for a range of coating applications, such applying paints, varnishes, preservatives, sealants, adhesives, inks, dyes etc. In such applications it is sometimes desirable to form a sharp edge without masking or a precise digital image and it is sometime desirable to form a uniform layer with soft edges which can be blended together with successive passes of the spray device. The required coating rates may also be very different between these two operation modes. This can be achieved with the claimed arrangement, which enables apertures in the first and second discrete regions to be selectively "switched on" and "switched" off through regulating the driving frequency.

The terms "first and second discrete regions" refer to distinct, non-overlapping, areas of the perforate membrane. The discrete regions may be directly adjacent to each other, or separated by an intermediate region.

The plurality of apertures of the first and second arrays may have substantially the same size. That is, the average size of the apertures of the first array may be within 10 percent, preferably 5 percent, of the average size of the apertures of the second array. The first and second arrays may be configured such that at least 80 percent, preferably at least 90 percent of the apertures of the first array are within the same size range as at least 80 percent, preferably at least 90 percent of the apertures of the second array. Where the plurality of apertures of the first and second arrays have substantially the same size, the configurations of the apertures of the first and second arrays may differ in other aspects, for example in shape, spacing, or profile in order to generate different droplet sizes.

As used herein, the term "average" refers to the mean average.

The plurality of apertures may further comprise one or more further arrays of apertures of different configurations to the first and second arrays of apertures. The one or more further arrays are preferably grouped together in one or more further discrete regions of the perforate membrane which are different to the first and second discrete regions.

The apertures of the first and second arrays may have substantially the same configuration as each other. For example, the apertures of the first and second arrays may have substantially the same size as each other. The apertures of the first and second arrays may be mixed. That is, the first and second arrays may each comprise a plurality of apertures of different configurations. For example, the first and second arrays may each comprise apertures of different sizes.

Preferably, the apertures of the first array are of a first aperture size and the apertures of the second array are of a second aperture size, wherein the first and second aperture sizes are different. Preferably, the first aperture size is less than the second aperture size.

The terms "first and second aperture size" refer to the average size of the apertures of the first and second arrays, respectively. Preferably, at least 60 percent, at least 70 percent, at least 80 percent, more preferably at least 90 percent of the apertures of the first array, have a size which is within 10 percent, preferably 5 percent of the first aperture size. Preferably, at least 60 percent, at least 70 percent, at least 80 percent, more preferably at least 90 percent of the apertures of the second array have a size which is within 10 percent, preferably 5 percent, of the second aperture size. This has been found to provide a particularly effective means by which different droplet size distributions can be generated.

The first aperture size may be less or greater than the second aperture size.

The term "aperture size" may refer to any objective size measurement. For example, maximum diameter, minimum diameter, surface area, circumference, or hydraulic diameter. Further, the term "aperture size" may refer to the dimensions of the aperture on the first side of the perforate membrane, or on the second side.

Preferably, the term "aperture size" refers to the hydraulic diameter on the second side of the perforate membrane. This has been found to be a key factor in the size of droplets generated by a given aperture.

Preferably, the apertures of the first array have a first average hydraulic diameter at the second side of the perforate membrane and the apertures of the second array have a second average hydraulic diameter at the second side of the perforate membrane, and wherein the second average hydraulic diameter is greater than the first average hydraulic diameter. The second average hydraulic diameter is preferably at least 10 percent greater, more preferably at least 30 percent greater, most preferably at least 50 percent greater than the first average hydraulic diameter.

Preferably, a majority of the apertures of the first array each have a hydraulic diameter at the second side of less than 15 microns, more preferably less than 10 microns, and most preferably less than 5 microns. Preferably, a majority of the apertures of the first array each have a hydraulic diameter at the second side of at least 0.5 microns, more preferably at least 1 micron, most preferably at least 2 microns. For example, at least 2 microns and less than 5 microns. These values of aperture size are particularly suited for aerosol generating devices used to generate an aerosol for inhalation, such as for nicotine delivery applications. For painting or printing applications, a majority of the apertures of the first array preferably each have a hydraulic diameter at the second side of less than 100 microns, more preferably from 30 to 90 microns.

The term "majority of the apertures" refers to a population of greater than 50 percent of all apertures of an array. The term may refer to at least 60 percent, at least 70 percent, at least 80 percent, or at least 90 percent of the apertures of that array.

In certain embodiments, at least 60 percent, at least 70 percent, at least 80 percent, or at least 90 percent of the apertures of the first array may each have a hydraulic diameter at the second side of less than 15 microns, more preferably less than 10 microns, and most preferably less than 5 microns. Preferably a majority of the apertures of the first array each have a hydraulic diameter at the second side of at least 0.5 microns, more preferably at least 1 micron, most preferably at least 2 microns, for example at least 2 microns and less than 5 microns. This has been found to be particularly effective at generating droplet sizes of 5 microns and below. Such droplet sizes have been found to be beneficial in allowing the droplets to reach the lung without impacting the throat. Once the droplets have passed the throat, then high uptake is facilitated by the capabilities of the lungs (larger surface area and high diffusivity) and can be further aided by rapid evaporation into the gaseous phase allows a high rate of uptake of the medicament while minimising the total quantity of medicament required for that uptake.

Preferably, a majority of the apertures of the second array each have a hydraulic diameter at the second side of at least 5 microns, preferably from 5 microns to 60 microns, more preferably from 5 microns to 50 microns, most preferably from 5 microns to 15 microns. In certain embodiments, at least 60 percent, at least 70 percent, at least 80 percent, or at least 90 percent of the apertures of the second array may each have a hydraulic diameter at the second side of at least 5 microns, preferably from 5 microns to 60 microns, more preferably from 5 microns to 50 microns, most preferably from 5 microns to 15 microns. This has been found to be particularly effective at generating droplet sizes of 10 microns or larger, for example up to 30 microns in diameter. Such droplet sizes have been found to be beneficial for flavour delivery and mouth feel.

The plurality of apertures of the first array may be evenly or unevenly spaced. The plurality of apertures of the second array may be evenly or unevenly spaced. A majority of the apertures of the first array may be spaced, at the second side of the perforate membrane, from any adjacent aperture by a first spacing and a majority of the apertures of the second array may be spaced, at the second side of the perforate membrane, from any adjacent aperture by a second spacing. Preferably, the second spacing is different to the first spacing.

As used herein, the terms "spaced" and "spacing" refer to the minimum distance between the outer edges of two adjacent apertures in the plane of the perforate membrane.

Varying the spacing between apertures can allow some droplets to coalesce into larger droplets while allowing other droplets to continue as individual droplets. As with the provision of different sized apertures, this allows different size droplets to be generated by the aerosol delivery system. This can allow the mouth feel and flavour delivery to be tuned independently of uptake in the lung and the level of catch in the throat. Coalescence from closely spaced holes tends to occur within 10 millimetres of the ejection from the perforate membrane and so is well established before the droplets enter the user's mouth and throat.

In such embodiments, the apertures of the first array may be substantially the same size as those of the second array. In other embodiments, the first aperture size and the second aperture size may be different and the first spacing and the second spacing may be different. This can enhance the difference between droplet sizes generated by the first and second arrays and can, therefore, enhance the degree to which droplet sizes can be tuned according to the specific application.

The first spacing is preferably greater than the second spacing. This can be particularly beneficial where the first aperture size is less than the second aperture size, since it can reduce the degree to which droplets from the first array coalesce and thereby maintain the distribution of small droplets from the first array.

Preferably the first spacing is at least 65 microns, preferably at least 75 microns. This has been found to reduce the occurrence of coalescence and promote the delivery of smaller droplets from the first array. Preferably, the second spacing is less than 75 microns, preferably less than 65 microns. This has been found to promote coalescence and thereby promote the delivery of larger droplets.

At least one of the first and second discrete regions may be located in or adjacent to a maximum excitation region of the perforate membrane in which the amplitude of vibration during use is at the maximum value.

The first and second discrete regions may both be located towards the periphery of the perforate membrane. Preferably, at least one of the first and second discrete regions is located towards a central region of the perforate membrane. For example overlapping with the central region, or entirely within the central region. The term "central region" refers to the area of the perforate membrane which is centred on the centroid of the perforate membrane. The central region may have an area of less than 50 percent of the total area of the perforate membrane, preferably less than 30 percent, more preferably less than 20 percent, most preferably less than 10 percent of the total area of the perforate membrane.

Optionally, both of the first and second discrete regions may be located towards the central region of the perforate membrane.

The first and second discrete regions may be approximately equidistant from the centroid of the perforate membrane.

In certain embodiments, the first discrete region is located towards the central region and the second discrete region is located peripherally of the first discrete region. For example, the second discrete region may be disposed around the first discrete region. The second discrete region may substantially circumscribe the first discrete region. The second discrete region may form an annulus around the first discrete region.

Preferably, the liquid droplet production apparatus comprises a reservoir configured to supply a liquid to the perforate membrane for ejection as liquid droplets. In such embodiments, the liquid droplet production apparatus may be configured as a removable cartridge for use with a master unit having the necessary control electronics. The liquid droplet production apparatus may comprise both a removable cartridge and a master unit. The liquid droplet production apparatus may comprise an integral reservoir which may be refillable.

The fluid reservoir may comprise a single reservoir.

In certain embodiments, the reservoir comprises a first reservoir portion configured to supply a first liquid to a first discrete region of the perforate membrane, a second reservoir portion configured to supply a second liquid to a second discrete region of the perforate membrane, and at least one liquid barrier configured to separate the first and second reservoir portions.

With this arrangement, two different liquid formulations can be stored separately in the fluid reservoir and ejected by a single perforate membrane. Where the at least one aperture comprises a first array of apertures in the first discrete region and a second array of apertures in the second discrete region, this arrangement also enables the apertures of the first and second arrays to be optimised for ejection of one of the first and second liquids, respectively, independently of the characteristics of the other of the first and second liquids. This can be particularly beneficial where the viscosity of the first liquid is different to the viscosity of the second liquid, since the ejection threshold tends to increase with viscosity.

The fluid reservoir may contain any suitable liquid formulation. The fluid reservoir may contain a first liquid formulation comprising a biologically active ingredient and a first liquid formulation comprising a flavourant. The fluid reservoir may contain a first and second liquid formulations each comprising a biologically active ingredient. The fluid reservoir may contain a first and second liquid formulations each comprising a flavourant.

The fluid reservoir may contain a liquid formulation comprising nicotine. Alternatively, or in addition, the fluid reservoir may contain a different formulation such as one comprising biologically active molecules in solvents, and/or biologically active molecules held in and on carrier systems. Carriers may be particulates of inorganic and organic materials. Carriers may be viral capsids or entities designed to mimic viral capsids.

The biologically active molecules may be small molecules with molecular mass of less than 1000 daltons; may be small molecules with molecular mass of less than 2000 daltons; molecules may be biologically derived macromolecules such as proteins and nucleic acids; molecules may be polymeric materials; molecules may be systems with long chain backbones or branched chain systems such as denrimers—for example with peptide, sugar phosphate, polyethylene oxide polysaccharide or other sugar; length of polymeric backbone may be from 2 units to many units. Molecules may be fusions of the above where more than one molecule may be formulated or covalently bound together.

For painting applications typical formulations may be selected from water-based emulsion paints, acrylic paints and inks, solvent-based or water-based enamel paints, varnishes and lacquers, wood stains, primers, undercoats, and preservatives that are applied for decorative and or protective purposes.

The liquid droplet production apparatus may be provided as a single unit with an integral fluid reservoir. In some embodiments, the liquid droplet production apparatus comprises a master unit and a removable cartridge configured to be removably coupled with the master unit. In such embodiments, preferably the actuator forms part of the master unit and the fluid reservoir forms part of the removable cartridge. This allows the removable cartridge to be removed and replaced easily when one or more liquids in the cartridge have been consumed.

Where the liquid droplet production apparatus comprises a master unit and a removable cartridge, the perforate membrane may be provided as part of the master unit or as an individual removable component. Preferably, the perforate membrane forms part of the removable cartridge. With this arrangement, the perforate membrane may be easily and regularly replaced along with the removable cartridge. This can have benefits in terms of maintaining performance. Keeping the cartridge and the perforate membrane together in this manner can ensure that the perforate membrane is used with a liquid formulation for which the configuration of its apertures has been specifically designed.

According to a second aspect of the invention, there is provided a removable cartridge for use in the liquid droplet production apparatus of the first aspect, the removable cartridge comprising a perforate membrane having at least one aperture, and a reservoir configured to supply a liquid to the perforate membrane for ejection as liquid droplets from the at least one aperture, wherein the perforate membrane comprises one or more stiffening structures for increasing the stiffness of the perforate membrane, the one or more stiffening structures each being defined by a local transverse deformation of the perforate membrane.

According to a third aspect of the invention, there is provided a perforate membrane for the liquid droplet production apparatus of the first aspect, or the removable cartridge of the second aspect, the perforate membrane comprising at least one aperture for ejecting liquid droplets during use, and one or more stiffening structures for increasing the stiffness of the perforate membrane, the one or more stiffening structures each being defined by a local transverse deformation of the perforate membrane.

According to a fourth aspect of the invention, there is provided an actuator assembly for a liquid production apparatus, the actuator assembly comprising a perforate membrane according to the third aspect and an annular actuator, wherein the perforate membrane is coupled to the annular actuator such that the perforate membrane extends across a central opening in the annular actuator. The perforate membrane may be bonded to the annular actuator.

According to a fifth aspect of the invention, there is provided a method of manufacturing a perforate membrane for a liquid droplet apparatus, comprising the steps of: placing a perforated sheet material in a press; and deforming the perforated sheet material with the press to form the perforate membrane, wherein the step of deforming the sheet material includes forming one or more local transverse deformations in the perforated sheet material to define one or more stiffening structures for increasing the stiffness of the perforate membrane.

The step of deforming the perforated sheet may be carried out by deforming the perforated sheet using a press in which a male tool is pressed into the sheet with free space across the majority of the underside of the sheet. In such embodiments, the process must be carefully controlled by displacement control, force control, or by use of a travel stop, to avoid over or under deforming of the perforate sheet by the male tool. The male tool may comprise a rigid pressing surface.

Preferably, the press includes a male tool comprising a compliant pressing surface and a female tool comprising a mould cavity, and wherein the step of deforming the perforated sheet material comprises deforming the perforated sheet material against the mould cavity of the female tool with the compliant pressing surface of the male tool, the mould cavity comprising one or more surface features configured to create the local transverse deformations in the perforate membrane. The compliant pressing surface may comprise rubber or polyurethane, for example.

The perforated sheet material may be free to move in the plane of the sheet during the deforming step. Preferably, a peripheral region of the perforated sheet material is constrained in a lateral direction during the deforming step. That is, in a direction along the plane of the perforated sheet. The lateral direction may be perpendicular to the pressing direction. The peripheral region of the perforated sheet material may be constrained in the lateral direction by a transversely applied load. The transversely applied load may be parallel with the pressing direction. For example, the lateral constraint may arise from a transversely applied load which traps the membrane to create a lateral constraint through friction as the periphery of the perforate sheet is deformed laterally inwards towards the centre of the perforate sheet as the transverse deformation is generated. The forming process needs to stretch the membrane material selectively and ideally result in a conveniently shaped edge to allow coupling to the actuator by bonding, welding or detachably attaching by means of magnetic attraction or mechanical attachment. By constraining a peripheral region of the perforated sheet material in a lateral direction during the deforming step, wrinkling of the edges of the sheet which might otherwise occur with an unconstrained sheet can be avoided. This can help to facilitate coupling of the resulting perforate membrane to the actuator.

Preferably, the compliant pressing surface of the male tool comprises a first clamping portion for clamping a peripheral region of the perforated sheet material against a second clamping portion of the female tool such that the peripheral region of the perforated sheet material is constrained in a lateral direction between the first and second clamping portions during the step of deforming the perforated sheet material. This has the advantage of naturally clamping the edge of the sheet before deforming and extending into the female tool to form the required shape without the need for additional clamping components. This technique is particularly beneficial for forming non-axisymmetric stiffening structures, such as radial stiffening ribs, as it avoids the challenge of ensuring correct tool alignment. As used herein, the term "lateral direction" refers to a direction along the plane of the perforated sheet material. This is preferably perpendicular to the pressing direction.

Preferably, the first and second clamping portions are planar, such that the step of deforming the perforated sheet material results in a perforate membrane comprising a planar peripheral region. This facilitates coupling of the membrane to a planar coupling portion of the actuator.

Features described in relation to one aspect of the invention may also be applicable to another aspect of the invention. In particular, features described in relation to the liquid droplet production apparatus of the first aspect may be applicable to the removable cartridge of the second aspect and/or the perforate membrane of the third aspect, and/or the actuator assembly of the fourth aspect, and/or the manufacturing method of the fifth aspect, and vice versa.

The invention will now be further described, by way of example only, with reference to the accompanying drawings, in which.

Figure 1:
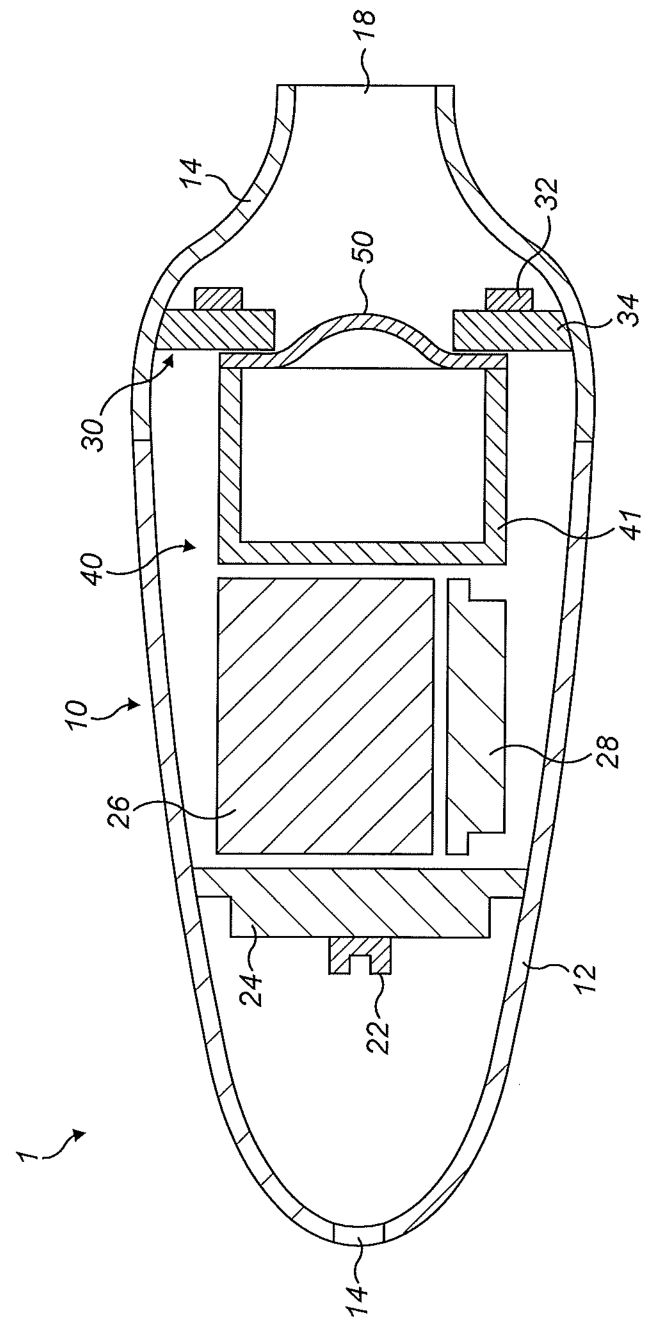
FIG. 1 shows a schematic representation of a liquid droplet production apparatus according to an embodiment of the invention.

FIG. 1 shows a schematic representation of a liquid droplet production apparatus 1 according to an embodiment of the invention. In this example, the liquid droplet production apparatus 10 is a handheld, portable device which comprises a main housing 12 and a mouthpiece 14 which is coupled to the main housing 12 to define a chamber within which at least some of the components of the apparatus 10 are held. The mouthpiece 14 may be removably coupled to the main housing 12 to allow the device to be used in conjunction with a removable cartridge. An air inlet 16 is provided at a distal end of the main housing 12 and the mouthpiece 14 defines an air outlet 18 at the proximal end of the device 10. An airflow pathway extends through the device 10 between the air inlet 16 and the air outlet 18. Also included in the device 10 is a flow sensor 22, preferably mounted on a printed circuit board (PCB) 24, a controller 26, a battery 28, an actuator 30 and a fluid reservoir 40. The PCB 24 and the controller 26 are shown schematically in FIG. 1 as different components. However, they could be combined into a single component, for example, one PCB including the sensor and the controller. The battery 28 supplies electrical power to the PCB 24, the controller 26 and the actuator 30.

The actuator 30 comprises an active component 32 bonded to a passive substrate 34. In this example, the actuator 30 comprises a lead zirconate titanate (PZT) ceramic active component 32, which is bonded to the substrate 34. However, the actuator 30 may comprise any suitable active component, such as an active component comprising a piezo electric, electrostrictive or magnetostrictive material (i.e. a material that changes shape in response to an applied electric or magnetic field). The substrate 34 is typically a metal disc, often stainless steel but also brass, other metal or indeed ceramic material such as zirconia or other resilient and ideally low damping material including glass for some specialised applications. The active component is typically bonded by adhesive, often epoxy, to the substrate or in some cases by diffusion bonding. The actuator 30 is planar and annular but may have any suitable shape.

The fluid reservoir 40 includes an outer casing 41 containing a liquid formulation for aerosolisation and having an opening at a one end. A perforate membrane 50 extends across the opening in the outer casing 41 and across the central opening in the actuator 30. The perforate membrane 50 is mounted such that a first side of the perforate membrane 50 is in fluid contact with the liquid formulation in the fluid reservoir and a second, opposite side of the perforate membrane 50 is facing the air outlet 18 in the mouthpiece 14. The perforate membrane 50 is typically formed from a thin metal with an array of one or more apertures extended through its thickness from on side to another. The membrane may also be made from a polymer. The illustration shows the membrane as a domed structure. The fluid reservoir 40 may include a porous carrier material (not shown) by which the liquid formulation is delivered to the perforate membrane 50 by capillary action. Alternatively, the liquid formulation may be delivered to the perforate membrane under the action of gravity or through other capillary means such as a capillary plate located close to the first face of the perforate membrane so as to hold liquid in contact with the perforate membrane.

In this example, the air inlet 16 is provided at a distal end of the main housing 12. Alternatively or in addition, an air inlet (not shown) may be provided on the side of the main housing 12 and adjacent to the actuator 30 to direct air across the second face of the perforate membrane 50 and to entrain and direct a stream of droplets out through the mouthpiece 14.

The actuator 30, the fluid reservoir 40 and the perforate membrane 50 may be joined together as a single unit. For example, these components may form part of a removable cartridge which can be removably coupled to the device. These components may alternatively form an integral and non-removable part of the device itself. Alternatively, the fluid reservoir 40 and the perforate membrane 50 may form part of a removable cartridge, while the actuator 30 forms a non-removable part of the device. In such examples, the actuator may be removably coupled to the membrane such that vibration of the active component is transferred to the membrane. The use of a removable cartridge allows the fluid reservoir to be exchanged when empty or when a different formulation is required. Any suitable coupling may be used. For example, the coupling can be mechanical, bayonet, compression fit, magnetic coupling, or any combination thereof. When coupled together, the actuator 30 and perforate membrane 50 can be considered to form an actuator assembly. The actuator 30 and the perforate membrane 50 may be bonded together.

In use, when a user inhales on the mouthpiece 14, air is drawn into the device 10 through the air inlet 16 and along the airflow pathway to trigger the flow sensor 22 which sends a signal to the controller 24. The controller 24 then generates a drive signal to drive the actuator 30 to vibrate and induce vibration in the perforate membrane 50. Vibration of the perforate membrane 50 causes the liquid formulation to pass through apertures in the perforate membrane 50 and to be ejected as liquid droplets from a second side of the perforate membrane 50. The droplets are fed into the air stream flowing along the airflow pathway to form an aerosol, which can be inhaled by the user via the mouthpiece 14. For details of the operation of the device 10, along with suitable actuator design and coupling of the actuation means to the perforate membrane, reference is made to WO 2015/004449 in which these aspects are described in detail.

Figure 2:
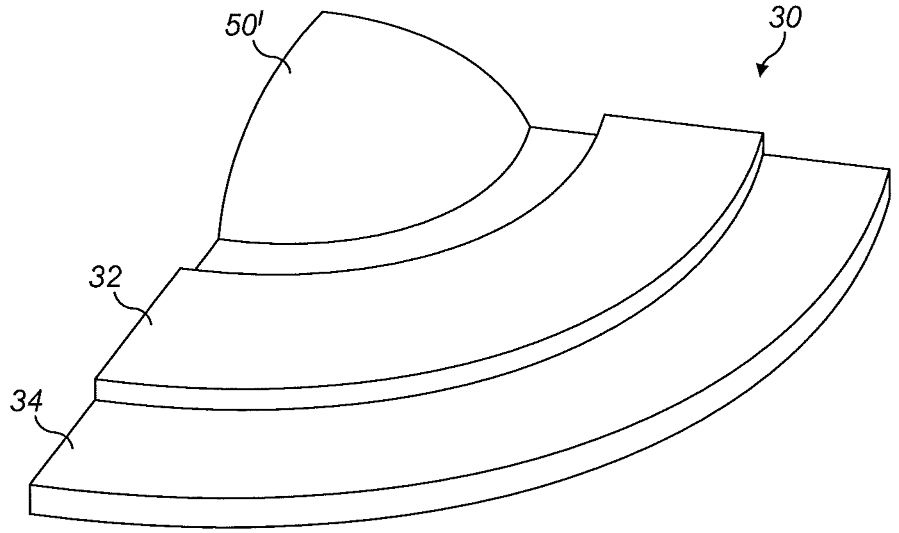
FIG. 2 is a perspective view of a section of a prior art actuator assembly for a liquid droplet production apparatus.

FIG. 2 is a perspective view of a section of an actuator assembly for a liquid droplet production apparatus, having an actuator 30 and a conventional, domed perforate membrane 50'. The actuator 30 comprises an active component 32 bonded to a passive substrate 34. The passive substrate 34 is typically a metal disc, often stainless steel but also brass, other resilient metal or indeed ceramic material such as zirconia or other resilient and ideally low damping material including glass for some specialised applications. The active component 32 is a piezo electric element, typically bonded by adhesive, often epoxy, to the substrate 34. The perforate membrane 50' is formed from a 50 micron sheet of perforated stainless steel, for example 316 or 304 grade stainless steel, having an array of apertures (not shown) extending from one side to another. The membrane can be made of any suitable material, such as a metal or a polymer. The membrane 50' has a domed primary shape. That is, the general overall shape of the perforate membrane 50' is that of a dome. The perforate membrane 50' also has a planar peripheral portion (not shown) by which the membrane 50' is coupled to the actuator 30. In this example, the membrane 50', as defined by the domed portion, has a diameter of 8 millimetres.

Figure 3:
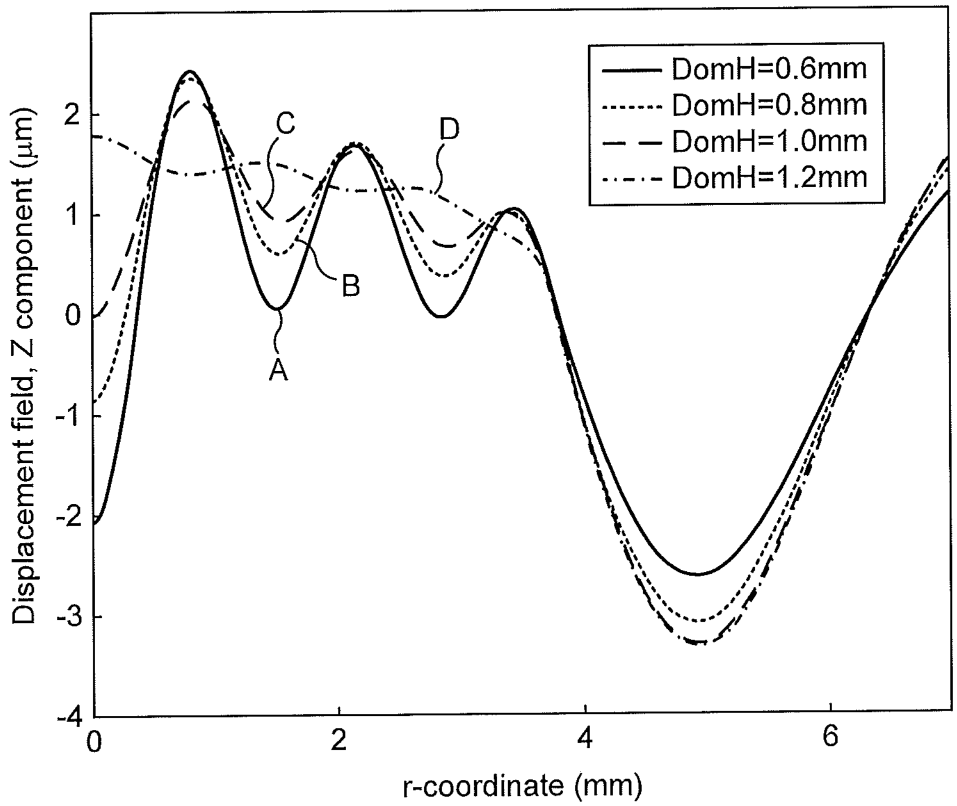
FIG. 3 is a graph showing vibration amplitudes for the actuator assembly of FIG. 2 with different extents of doming.

FIG. 3 is a graph showing vibration amplitudes for the actuator assembly of FIG. 2 when vibrated at 104.5 kHz and with different extents of doming. Trace A shows the displacement when the perforate membrane 50' has dome height of 0.6 mm. Trace B shows the displacement when the perforate membrane 50' has dome height of 0.8 mm. Trace C shows the displacement when the perforate membrane 50' has dome height of 1.0 mm. Trace D shows the displacement when the perforate membrane 50' has dome height of 1.2 mm. In each case, the perforate membrane 50' extends from 0 to 4 mm on the R-coordinate axis and the substrate 34 extends from 4 mm to 7 mm on the R-coordinate axis. As can be seen, traces A-C exhibit higher order vibration with peaks of amplitude occurring at approximately 0.8 mm, 2.2 mm and 3.5 mm from the centre of the perforate membrane, and a number of velocity nodes at which displacement is substantially lower. Traces A and B also have a displacement peak at the centre of the perforate membrane and so have four peaks in total, whereas trace C has a velocity node at the centre of the perforate membrane and so has three peaks in total.

With these types of membrane, the mass flow of droplets may be reduced by such vibration behaviour. Trace D, on the other hand, exhibits substantially single order vibration, in which the majority of the membrane moves in phase and the overall mass flow may be higher than for the membranes illustrated by traces A-C. The amplitude of displacement of the centroid of the membrane (0 mm on the R-coordinate axis) is also far higher for trace D than for traces A-C, meaning that apertures in this region are far more likely to be accelerated above their ejection threshold. However, the extent of doming necessary for such single order vibration can compromise the strength or fatigue life of the membrane and can cause damage or deformation to the holes in the membrane, leading to variations in the directionality of the holes from the forming process.

Figure 4:
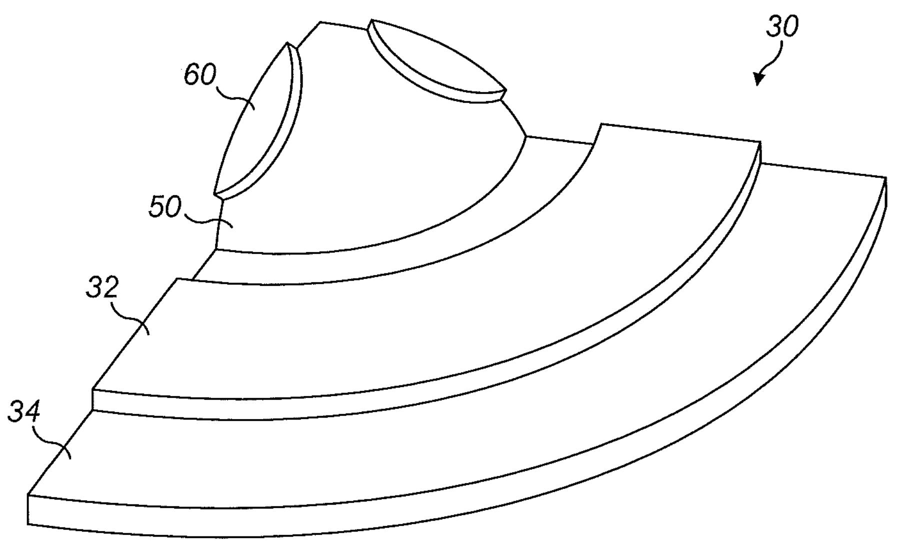
FIG. 4 is a perspective view of a section of an actuator assembly having a perforate membrane according to a first embodiment of the invention.

FIG. 4 is a perspective view of a section of an actuator assembly having a perforate membrane 50 according to a first embodiment of the invention. The actuator 30 and perforate membrane 50 have the same structure and function as described above in relation to FIGS. 2 and 3. However, in addition to having a domed primary shape and a planar peripheral portion, the perforate membrane 50 also has a plurality of stiffening structures in the form of a plurality of elongate local transverse deformations 60 in the structure of the membrane 50 which form an interruption to the domed primary shape. These transverse deformations extend in the same direction as the curvature of the dome and so extend upwardly from the dome. Thus, the deformations 60 form a plurality of local protrusions on the upper surface of the dome. In this example, the plurality of elongate transverse deformations are linear and extend in a radial direction of the perforate membrane from a radial position outward of the centroid to a radial position inward of the point at which the membrane is coupled to the substrate. However, in other examples, one or more of the transverse deformations could extend to the centroid and/or to the substrate. Although only two transverse deformations 60 are shown in FIG. 4, it will be appreciated that this view shows only a quarter of the perforate membrane 50 and that the membrane actually comprises four radial, elongate transverse deformations 60 which are evenly offset around the membrane 50. Of course, in other examples, the perforate membrane may comprise more or fewer transverse deformations, which may or may not be evenly spaced. In this example, the membrane has a dome with a height at the centroid of 0.8 mm, and the elongate transverse deformations have a length of about 2.5 mm, a maximum width of about 1 mm, and a maximum height of about 0.25 mm. The effect of the transverse deformations on the stiffness of a membrane is quite dramatic due to the cubic relationship between thickness and stiffness in the transverse plane. The range of applicable deformation that are useful scales with the size of the membrane and the need to preserve area for nozzles but can be as small as 150 microns out of plane and as large as 1.5 mm and vary in width between 0.2 mm and as large as 2 mm for a typical device. This approach also has particular advantage to larger devices where thin membranes lack of stiffness is problematic and the size of deformations typically scale with the size of the membrane. It will be understood that "maximum height" refers to the extent to which the deformation extends beyond the height at which it would otherwise extend if the membrane followed the curve of the primary dome at a given radial position of the membrane.

Figure 5:
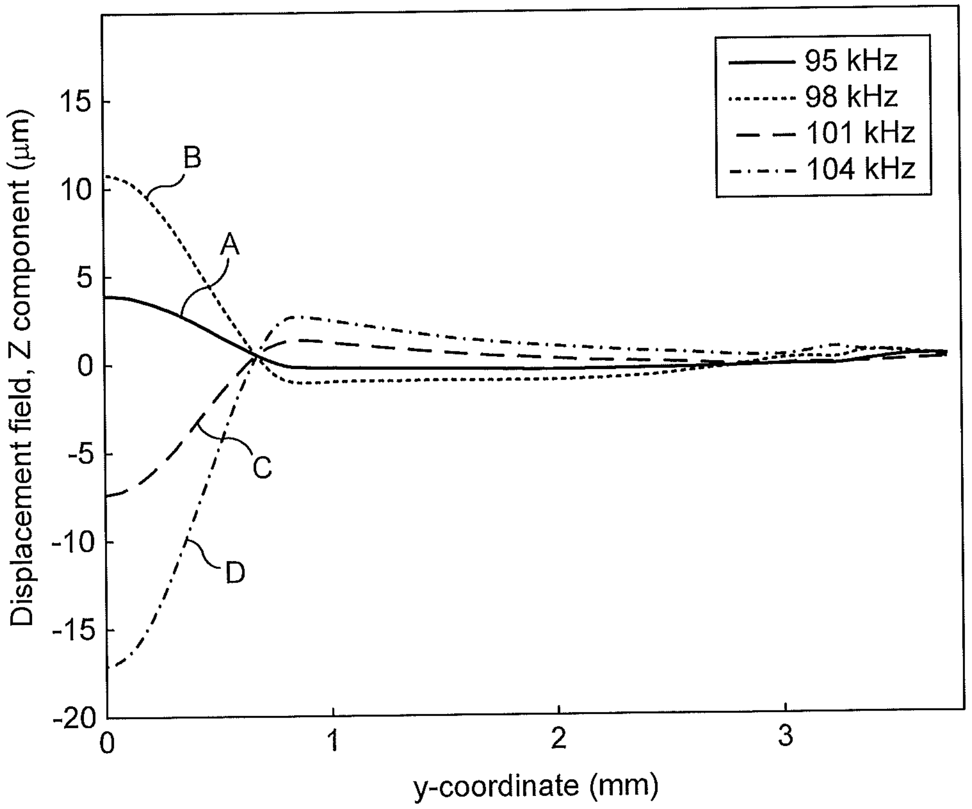
FIG. 5 is a graph showing vibration amplitudes for the perforate membrane of the first embodiment when vibrated at different frequencies.

FIG. 5 is a graph showing vibration amplitudes for the perforate membrane 50 of the first embodiment when vibrated at different frequencies. As with the graph of FIG. 3, the perforate membrane extends from 0 to 4 mm on the R-coordinate axis. However, the vibration amplitude of the actuator is not shown. Trace A shows the displacement when the perforate membrane is vibrated at 95 kHz. Trace B shows the displacement when the perforate membrane is vibrated at 98 kHz. Trace C shows the displacement when the perforate membrane is vibrated at 101 kHz. Trace D shows the vibration behaviour when the perforate membrane is vibrated at a resonant frequency of 104 kHz. Due to the presence of the stiffening structures, at this frequency, the centre of the membrane is vibrated at an amplitude of from five to ten times more than a conventional domed mesh, while the rest of the membrane has a similar amplitude to a domed membrane. Advantageously, with this arrangement, ejection from apertures at the centre of the membrane can be selectively "switched on" or "switched off" by regulating the drive frequency with which the perforate membrane is vibrated.

Figure 6:
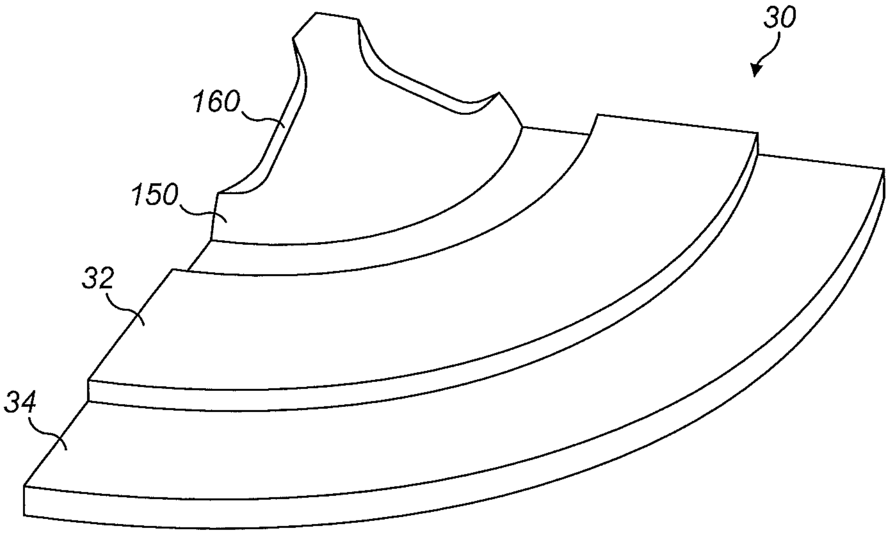
FIG. 6 is a perspective view of a section of an actuator assembly having a perforate membrane according to a second embodiment of the invention.

FIG. 6 is a perspective view of a section of an actuator assembly having a perforate membrane 150 according to a second embodiment of the invention. The actuator 30 and perforate membrane 150 have the same structure and function as described above in relation to FIG. 4. As with the first embodiment of membrane 50, the second embodiment of membrane 150 comprises a plurality of stiffening structures in the form of a plurality of elongate transverse deformations 160 in the structure of the membrane 50 which form an interruption to the domed primary shape. However, unlike the first embodiment of membrane 50, the transverse deformations 160 of the second embodiment of membrane 150 extend in the opposite direction to the curvature of the dome. Thus, the deformations 160 form a plurality of local indentations in the upper surface of the dome. In this example, as with the first embodiment of membrane 50, the plurality of elongate transverse deformations 160 are linear and extend in a radial direction of the perforate membrane from a radial position outward of the centroid to a radial position inward of the point at which the membrane is coupled to the substrate. However, in other examples, one or more of the transverse deformations 160 could extend to the centroid and/or to the substrate. Although only two transverse deformations 160 are shown in FIG. 6, it will be appreciated that this view shows only a quarter of the perforate membrane 150 and that the membrane actually comprises four radial, elongate transverse deformations 160 which are evenly offset around the membrane 50. Of course, in other examples, the perforate membrane may comprise more or fewer transverse deformations, which may or may not be evenly spaced. In this example, the membrane has a dome with a height at the centroid of 0.8 mm, and the elongate transverse deformations have a length of about 2.5 mm, a maximum width of about 1 mm, and a maximum height of about 0.25 mm. It will be understood that "maximum height" refers to the extent to which the deformation extends beyond the height at which it would otherwise extend if the membrane followed the curve of the primary dome at a given radial position of the membrane. The vibration characteristics of the first embodiment of membrane 150 are similar to those of the first embodiment of membrane 50, as illustrated in FIG. 5.

Figure 7:
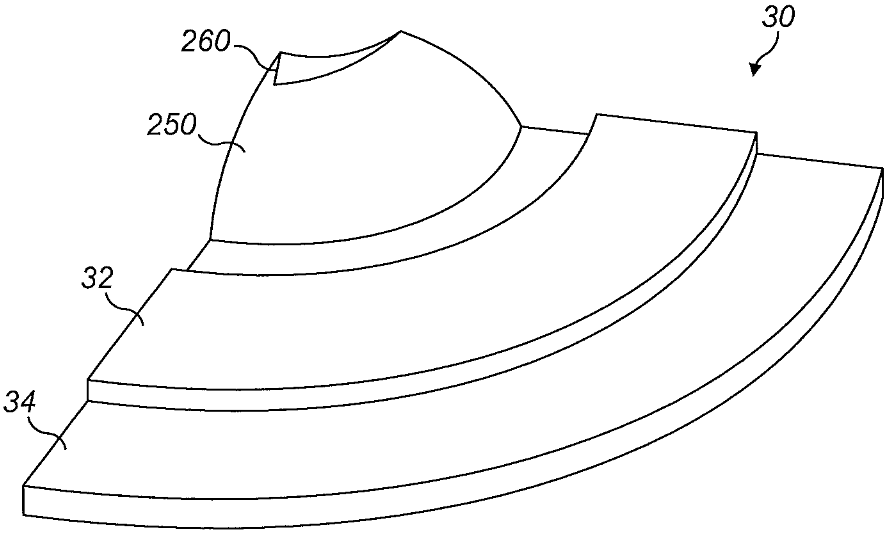
FIG. 7 is a perspective view of a section of an actuator assembly having a perforate membrane according to a third embodiment of the invention.

FIG. 7 is a perspective view of a section of an actuator assembly having a perforate membrane 250 according to a third embodiment of the invention. The perforate membrane 250 has the same general structure and function as described above in relation to FIGS. 4 and 6. However, unlike the first and second embodiments of membrane, the third embodiment of perforate membrane 250 has a single stiffening structure in the form of a single transverse deformation 260 located at the centroid of the perforate membrane 250. Thus, the central region of the perforate membrane 250 is defined by the transverse deformation 260 of the stiffening structure. In this example, the transverse deformation 260 is circular and centralised at the centroid of the perforate membrane and so is axisymmetrical. The transverse deformation 260 extends in the opposite direction to the curvature of the domed primary shape. Consequently, the transverse deformation 260 forms a central dimple in the centre of the domed primary shape. In other examples, the transverse deformation could extend in the same direction to the curvature of the domed primary shape and so form a central protrusion in the centre of the domed primary shape. In this example, the membrane has a domed primary shape with a height at the centroid of 0.8 mm. This refers to the height that the primary shape would reach in the absence of the transverse deformation. The transverse deformation preferably has a depth in the range of 0.1 mm to 2 mm and a radius in the range of 0.5 mm to 2 mm. In this example, the transverse deformation, or "dimple", has a depth of about 0.2 mm and a radius of about 1.2 mm. It will be understood that "depth" is the opposite of "height" and refers to the maximum extent to which the deformation extends below the theoretical curve of the primary dome at a given radial position of the membrane.

Figure 8:
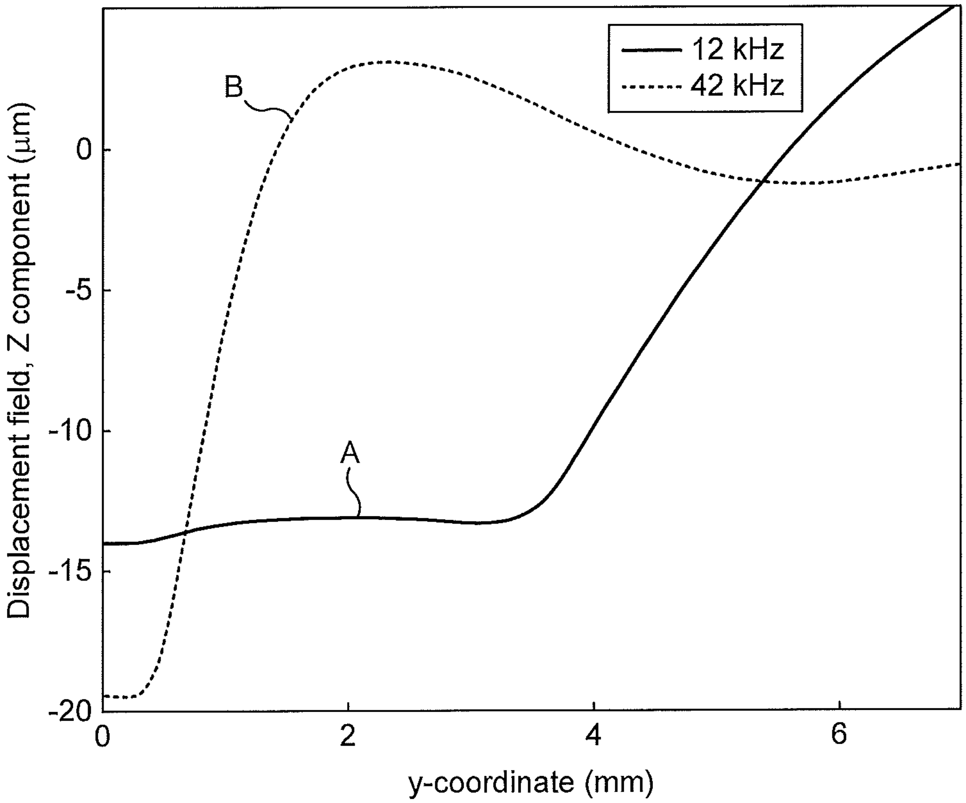
FIG. 8 is a graph showing vibration amplitudes for the perforate membrane of the third embodiment when vibrated at different frequencies.

FIG. 8 is a graph showing vibration amplitudes for the perforate membrane of the third embodiment when vibrated at different frequencies. The perforate membrane extends from 0 to 4 mm on the y-coordinate axis, while the substrate of the actuator extends from 4 mm to 7 mm on the y-coordinate axis. The y-coordinate axis is the same as the R-coordinate axis shown in FIGS. 3 and 5. Trace A shows displacement amplitude when the perforate membrane is vibrated at 12 kHz, in which first order vibration is exhibited. Trace B shows displacement amplitude when the perforate membrane is vibrated at 42 kHz, in which second order vibration is exhibited. With this arrangement, the amplitude of vibration at the centre of the membrane can be greatly increased relative to a conventional domed membrane. Advantageously, ejection from apertures which are peripheral of the centre of the membrane can be selectively "switched on" or "switched off" by regulating the drive frequency with which the perforate membrane is vibrated. In particular, ejection from apertures which are peripheral of the centre of the membrane can be selectively "switched on" by vibrating the membrane such that it exhibits first order vibration, and can be selectively "switched off" by vibrating the membrane such that it exhibits second order vibration. The frequency at which the shift between operating modes occurs can be adjusted by changing the geometry of the membrane.

Figure 9:
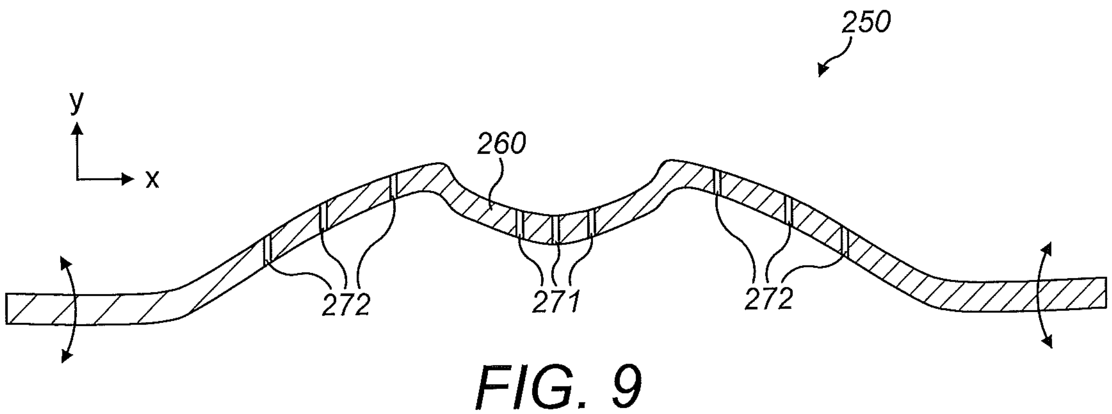
FIG. 9 shows a cross-section of the third embodiment of perforate membrane of FIG. 7, in which the membrane is provided with a plurality of apertures according to a first arrangement.

FIG. 9 shows a cross-section of the third embodiment of perforate membrane in which the membrane is provided with a plurality of apertures according to a first arrangement. This embodiment is particularly beneficial for printing with multiple spot sizes. The perforate membrane 250 is typically actuated towards its outer edges, as indicated by the arrows. A first array of apertures 271 for producing a small spot are located near the centre of the membrane 250 and within the region of the membrane 250 defined by the central dimple 260. A second array of apertures 272 are located further from the centre on the domed portion of the membrane 250. At a first operation frequency at which first order vibration is exhibited, all of the apertures move with a similar high velocity and above their ejection threshold. Consequently, a large spot size is produced. At a second operation frequency, in which a higher order vibration, such as second order vibration, is exhibited the central apertures 271 move at a high velocity and eject fluid whereas the second array of apertures 272 move at a low velocity and do not eject fluid. Hence, a small spot size is produced. In this example, both the first and second arrays of apertures 271 and 272 extend through the thickness of the perforate membrane at an angle to the normal of the perforate membrane, such that each aperture is aligned with the transverse axis of the membrane 250, which is indicated in FIG. 9 by the y-axis. With this arrangement, the direction of ejection from the first set of the plurality of apertures is independent of the shape of the membrane at the point at which the membrane is located. This means that the ejected fluid droplets all move approximately in the direction of the transverse axis and the resulting spray angle is reduced.

Figure 10:
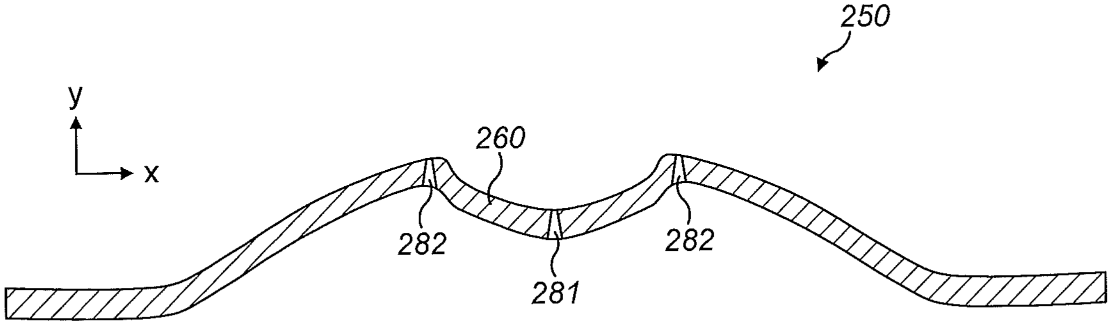
FIG. 10 shows a cross-section of the third embodiment of perforate membrane of FIG. 7, in which the membrane is provided with a plurality of apertures according to a second arrangement.

FIG. 10 shows a cross-section of the third embodiment of perforate membrane in which the membrane is provided with a plurality of apertures according to a second arrangement. As with the first arrangement of apertures, this embodiment is particularly beneficial for printing with multiple spot sizes. A single aperture 281 is located at the centroid of the membrane 250 and within the region of the membrane 250 defined by the central dimple 260. A second array of apertures 282 are located at the transition between the central dimple and the domed portion of the membrane 250. At a first operation frequency at which first order vibration is exhibited, all of the apertures move with a similar high velocity and above their ejection threshold. Consequently, a large spot size is produced. At a second operation frequency, in which a higher order vibration, such as second order vibration, is exhibited, the central aperture 281 moves at a high velocity and ejects fluid whereas the second array of apertures 282 move at a low velocity and do not eject fluid. Hence, a small spot size is produced. In this example, the apertures 281, 282 are located in regions in which the perforate membrane 250 is in the x-z plane, so apertures drilled straight through the perforate membrane, i.e. normal to the membrane, are oriented approximately along the y-axis. This means that the ejected fluid droplets all move approximately in the direction of the transverse axis and the resulting spray angle is reduced.

Figure 11:
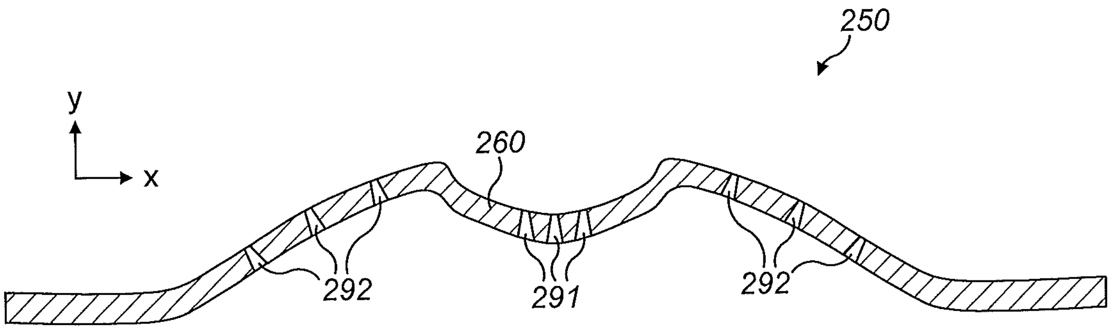
FIG. 11 shows a cross-section of the third embodiment of perforate membrane of FIG. 7, in which the membrane is provided with a plurality of apertures according to a third arrangement.

FIG. 11 shows a cross-section of the third embodiment of perforate membrane in which the membrane is provided with a plurality of apertures according to a third arrangement. The arrangement is particularly well suited for applications in which the actuator assembly is required to spray with multiple plume angles. As with the arrangement shown in FIG. 9, the third arrangement of apertures includes a first array of apertures 291 for producing a small spot, which are located near the centre of the membrane 250 and within the region of the membrane 250 defined by the central dimple 260, and a second array of apertures 292 which are located further from the centre on the domed portion of the membrane 250. The first array of apertures 291 extend through the thickness of the perforate membrane at an angle to the normal of the perforate membrane, such that each aperture is aligned with the transverse axis of the membrane 250, which is indicated in FIG. 11 by the y-axis. The second array of apertures 292 extend through the thickness of the perforate membrane along the normal of the perforate membrane, such that the direction of ejection for each of the second array of apertures is along the normal of the membrane 250. At a first operation frequency, at which first order vibration is exhibited, all of the apertures move with a similar high velocity and above their ejection threshold. Consequently, a wide spray plume angle is produced. At a second operation frequency, in which a higher order vibration, such as second order vibration, is exhibited, the central apertures 291 move at a high velocity and eject fluid whereas the second array of apertures 292 move at a low velocity and do not eject fluid. These inner apertures 291 are closely spaced and more closely parallel to the y-axis, hence, a narrow plume angle is produced. Advantageously, the two sets of apertures 291 and 292 may have different size distributions, in order to further control the spray behaviour.

Figure 12:
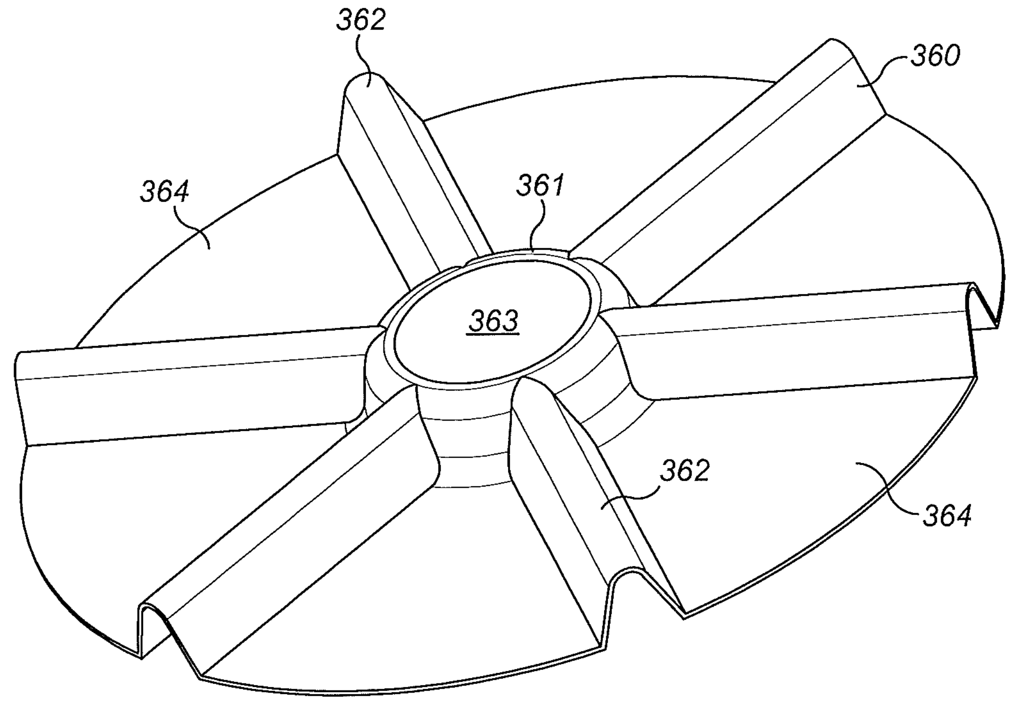
FIG. 12 is a perspective view of a perforate membrane according to a fourth embodiment of the invention.

FIG. 12 is a perspective view of a perforate membrane 350 according to a fourth embodiment. Unlike the first to third embodiments of perforate membrane, the fourth embodiment of perforate membrane 350 has a planar primary shape. The membrane 350 comprises a plurality of stiffening structures in the form of a plurality of elongate local transverse deformations 360 in the structure of the membrane 350 which form an interruption to the planar primary shape. The elongate transverse deformations 360 include an annular transverse deformation 361 which circumscribes the centre of the membrane 350, and a plurality of radial elongate transverse deformations 362 which extend radially from the annular transverse deformation 361 to the peripheral edge of the membrane 350. In this example, the transverse deformations 360 extend upwards and so form a plurality of local protrusions on the upper surface of the membrane 350. The transverse deformations 360 divide the planar membrane 350 into a plurality of planar regions, including a planar central region 363 and a number of planar segments 364 which are offset around the circumference of the membrane 350. Advantageously, the membrane 350 includes a plurality of apertures which are located in one or more of the plurality of planar regions. With this arrangement, the stiffening structures can be positioned to increase the structural stiffness of the perforate membrane while avoiding the apertures. This has the particular advantage of allowing the stiffening structure to completely avoid the regions with holes so that the direction of the droplets can be well controlled and the holes are not subject to the strain associated with the forming the stiffening structures.

Figure 13:
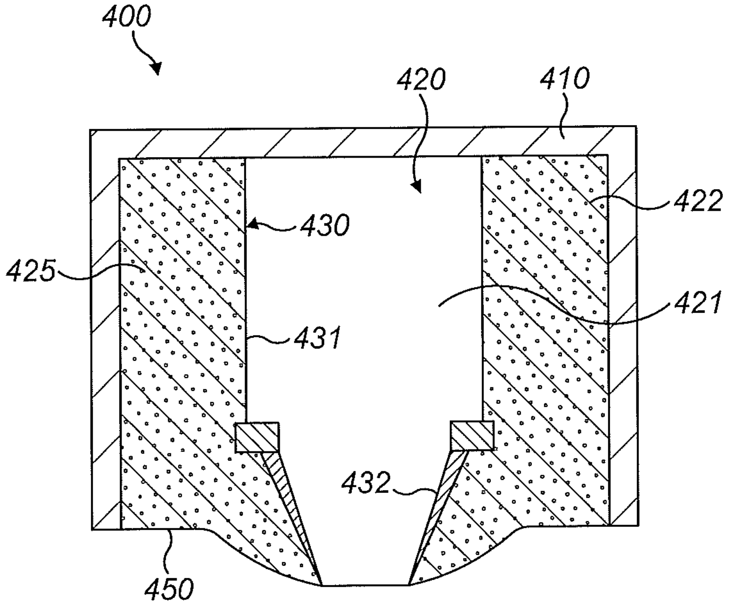
FIG. 13 is a schematic cross-sectional view of a removable cartridge comprising the third embodiment of perforate membrane of FIG. 7.

FIG. 13 is a schematic cross-sectional view of a removable cartridge 400 comprising the perforate membrane 250 according to the third embodiment. The cartridge 400 includes an outer casing 410 defining a fluid reservoir 420 with an opening at the first end of the cartridge, and a perforate membrane 250 across the opening in the fluid reservoir 420. The fluid reservoir 420 includes a first reservoir portion 421 for containing a first liquid formulation, a second reservoir portion 422 for containing a second liquid formulation, and a liquid barrier 430 configured to separate the first and second reservoir portions 421, 422. The liquid barrier 430 extends along the length of through the fluid reservoir 420 from a base of the casing 410 at the second end of the cartridge to the perforate membrane 450 to separate the first and second reservoir portions. The first and second reservoir portions have respective first and second openings at the first end of the cartridge. The first and second openings are configured to allow fluid communication between the perforate membrane and the first and second reservoir portions so that first and second liquids in the first and second reservoir portions can be delivered to the membrane during use. In this example, the second reservoir portion 422 comprises a porous carrier material 424 in which the second liquid formulation may be absorbed and retained. The porous carrier material 424 is in contact with the first side of the perforate membrane 250 so that the second liquid formulation can be delivered to the first side of the perforate membrane 250 by capillary action. The porous carrier material may be formed from any suitable material or materials. For example, the porous carrier material may comprise open-cell foam such as polyurethane foam, polyvinyl alcohol (PVA) foam, polyether foam or a combination of foams, a felt material such as polypropylene, polyester, or rayon, a filter material such as polypropylene or a fibrous material such as polyester material in woven or non-woven forms. The porous material could be provided by a sequence of moulded channels of such size that capillary action will retain fluid. The preferred material should have appropriate pore size or capillary channel size to retain the operating fluid and should have properties that are compatible with the fluid (chemical resistance) non contaminating (extractables and leachables) and non-binding such that the target fluid or in particular the active component does not preferentially adhere to the material and so inhibit delivery.

The first and second reservoir portions may have any suitable shape. In this example, the second reservoir portion 422 is annular and defines a cavity extending along its central axis in which the first reservoir portion 421 and the liquid barrier 430 are disposed. In this example, the liquid barrier 430 comprises a barrier wall 431 extending from the base of the fluid reservoir 420 at its first end, and having a flexible seal 432 at its second end. The flexible seal 432 contacts the first side of the perforate membrane 450 and is configured to ensure that the first and second reservoir portions 421, 422 are separated even when the perforate membrane is vibrated. The flexible seal 432 is preferably a resilient seal. With this arrangement, when the flexible seal 432 is deflected by vibration of the perforate membrane 250, the flexible seal 432 is pressed against the first side of the perforate membrane 250 to improve sealing between the liquid barrier 430 and the perforate membrane 250. This can reduce the extent to which first and second liquid formulations might mix prior to aerosolisation by passing around the upper end of the liquid barrier 430, particularly during vibration of the perforate membrane 250. As shown, the flexible seal 432 preferably tapers inwardly towards the perforate membrane 250. This can reduce the force required for the perforate membrane 250 to deflect the flexible seal 432 and so minimise the impact that the flexible seal has on the deflection of the perforate membrane during operation. Where the perforate membrane 250 includes first and second arrays of apertures arranged in first and second discrete regions of the perforate membrane 250, as discussed above, the liquid barrier 430 is preferably configured to separate the first and second discrete regions on the first side of the perforate membrane. With this arrangement, the first liquid formulation is ejected only from the first array of apertures and the second liquid formulation is ejected only from the second array of apertures. This enables the composition of liquid droplets produced to be varied by regulating the drive frequency with which the perforate membrane 250 is vibrated.

Figure 14:
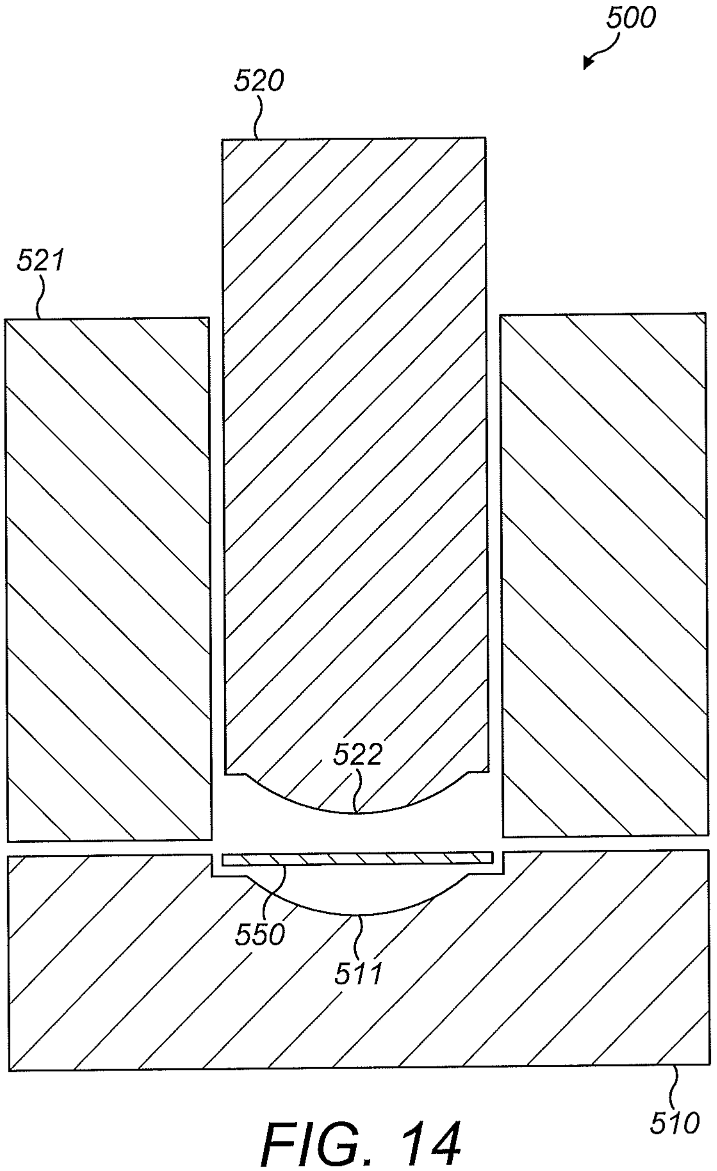
FIG. 14 shows a cross section of a first forming tool for manufacturing a perforate membrane from a perforated sheet material.

FIG. 14 shows a cross section of a first forming tool 500 for manufacturing a perforate membrane from a perforated sheet material 550. The perforated sheet material 550 is received in a lower forming tool 510 with mould cavity 511. The male tool 520 slides in the upper jig 521 such that the pressing surface 522 of the male tool 520 contacts the perforated sheet material 550. The mould cavity 511 and the pressing surface 522 are cooperatively shaped and one or both include one or more surface features for forming the one or more transverse deformations of the perforate membrane when the perforated sheet material 550 is pressed by the forming tool 500. Because the perimeter of the perforated sheet material 550 is not clamped for the initial doming, this form of doming tool tends to lead to a crinkled or wrinkled perimeter.

Figure 15:
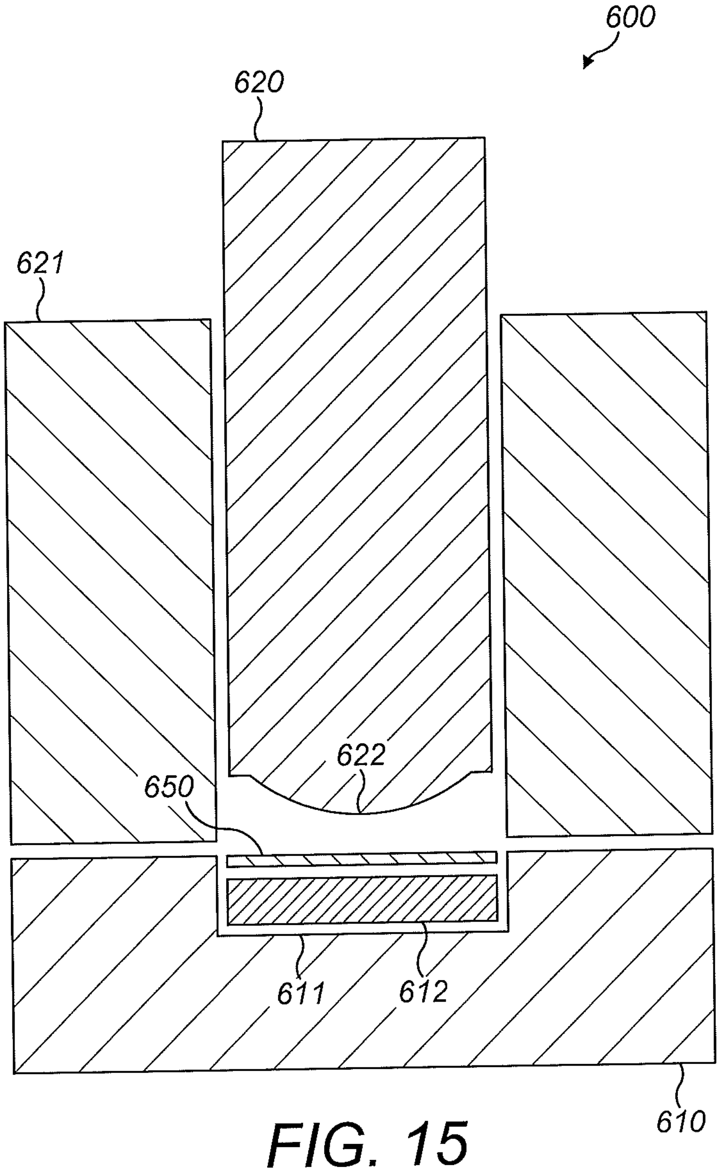
FIG. 15 shows a cross section of a second forming tool for manufacturing a perforate membrane from a perforated sheet material.

FIG. 15 shows a cross section of a second forming tool 600 for manufacturing a perforate membrane from a perforated sheet material 650, where the perforated sheet material 650 is received in a lower forming tool 610 with a recess 611 filled with a deformable member 612. The male tool 620 slides in the upper jig 621 such that the pressing surface 622 of the male tool 620 contacts the perforated sheet material 650. The pressing surface 622 is shaped and includes one or more surface features for forming the one or more transverse deformations of the perforate membrane when the perforated sheet material 650 is pressed by the forming tool 600. Because the perimeter of the perforated sheet material 650 is not clamped for the initial doming, this form of doming tool tends to lead to a crinkled or wrinkled perimeter.

Figure 16:
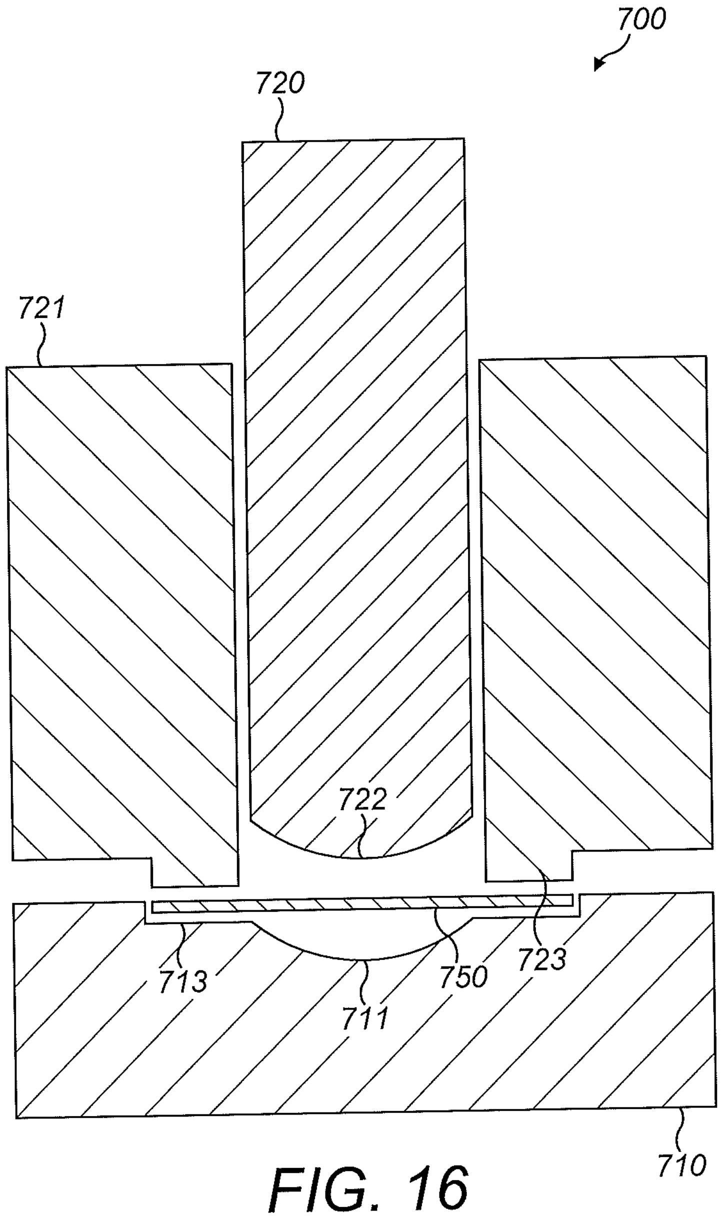
FIG. 16 shows a cross section of a third forming tool for manufacturing a perforate membrane from a perforated sheet material.

FIG. 16 shows a cross section of a third forming tool 700 for manufacturing a perforate membrane from a perforated sheet material 750, where the perforated sheet material 750 is held around its periphery during deformation. The perforated sheet material 750 is held between a first clamping portion 723 of the upper jig 721 and a second clamping portion 713 of the lower forming tool 710. The perforated sheet material 750 is held such that it extends across the mould cavity 711 of the female tool 710. The first and second clamping portions preferably extend around the entire circumference of the perforated sheet material 750. The first and second clamping portions are preferably annular. The male tool 720 slides in the upper jig 721 such that the pressing surface 722 of the male tool 720 contacts the perforated sheet material 750. The mould cavity 711 and the pressing surface 722 are cooperatively shaped and one or both include one or more surface features for forming the one or more transverse deformations of the perforate membrane when the perforated sheet material 750 is pressed by the forming tool 700. Because the perimeter of the perforated sheet material 750 is clamped between two planar clamping portions, the resulting perforate membrane has a planar perimeter. In this case the male tool 720 is limited in its travel by the shape of the female mould cavity 711.

Figure 17:
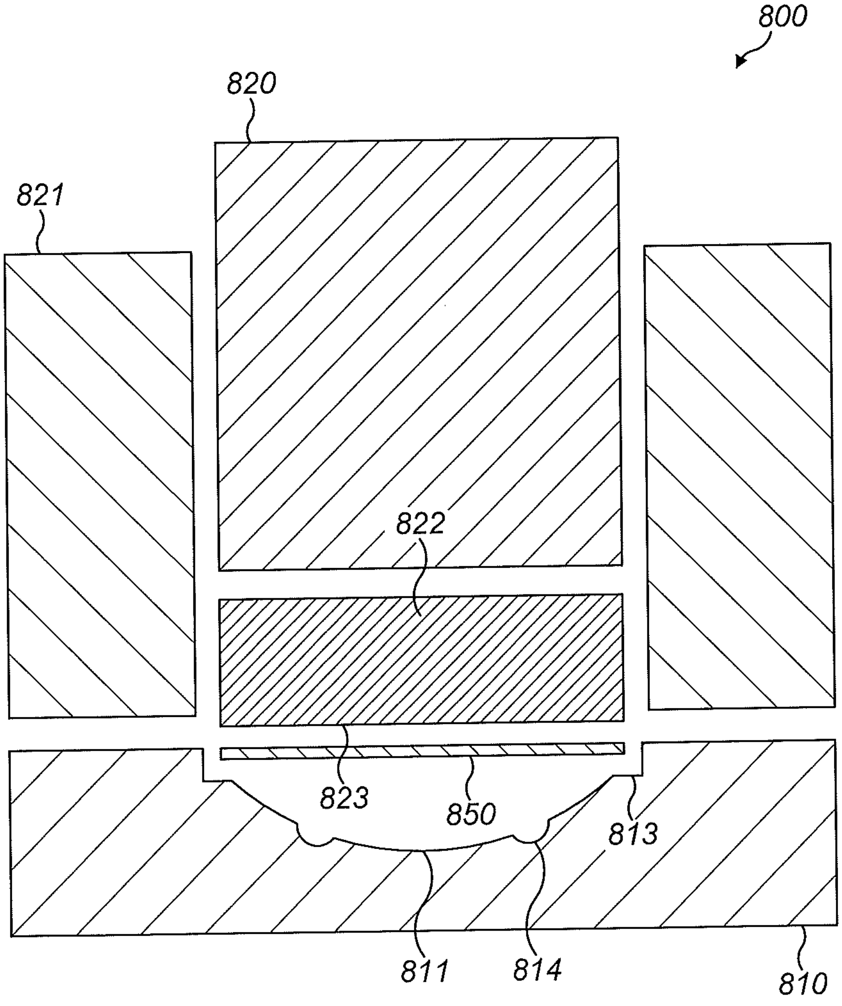
FIG. 17 shows a cross section of a fourth forming tool for manufacturing a perforate membrane from a perforated sheet material.

FIG. 17 shows a cross section of a fourth forming tool 800 for manufacturing a perforate membrane from a perforated sheet material 850. The perforated sheet material 850 is received in a lower forming tool 810 with mould cavity 811 including a number of surface features 814 for forming the one or more transverse deformations of the perforate membrane when the perforated sheet material 850 is pressed by the forming tool 800. In this example, the surface features are indentations in the mould cavity 811 such that the resulting perforate membrane comprises one or more protrusions which extend in the same direction as the domed primary shape. In other examples, the surface features may comprise protrusions, or a combination of indentations and protrusions. The male tool 820 has a compliant pressing surface 822, such as rubber or polyurethane pad, which is pressed against the perforated sheet material 850 as the male tool 820 slides in the upper jig 821. The pad 822 first clamps the perimeter of the perforated sheet material 850 between a first clamping portion 823 of the compliant pressing surface 822 and a second clamping portion 813 of the female tool 810. The first and second clamping portions preferably extend around the entire circumference of the perforated sheet material. The first and second clamping portions are preferably annular. With increasing force applied to the male tool 810, the pad 822 deforms and presses the perforated sheet material 850 into the female recess 811 and against the stiffening features. This form of tool allows a planar perimeter to result after deformation. It also has the advantage of clamping the edge of the sheet without the need for additional clamping components. This can be particularly beneficial for forming non-axisymmetric stiffening structures, such as radial stiffening ribs, as it avoids the challenge of ensuring correct tool alignment between the male and female tools.

There are a number of different methods by which the apertures in the perforate membranes can be formed. For example, the apertures can be formed by electroforming the membrane, or by laser drilling.

Electroforming typically involves over growing nickel based alloys over a smooth substrate with a pattern of photo resist spots used to define the pattern of holes, as carried out by Veco B. V. Eerbeek, of The Netherlands. The size of the holes is then typically a function of the thickness of material grown over the resist spots. However, this method may make it difficult to control hole size, especially for smaller holes. The strong dependency on the thickness of deposited material means that the tolerance for small holes is relatively broad. A second issue is that forming two size holes at the same time is inconsistent as this will depend on the size of resistance spot applied and the thickness of deposited plating. This means that the process control has the challenge of controlling two variables with only one control parameter, thickness, further leading to yield issues. This process also has a limited choice of materials which can be used with some robustness and compatibility issues. As above the overgrowing method of forming small holes is problematic but there is an alternative of using a thick resist method where the hole size is defined by the photo resist, or photo-defined hole size. In its simplest form this allow formation of parallel sided holes where their diameter is defined by the photo resist pattern, which in turn allows a range of hole sizes to be formed at the same time. The combination of using two resist layers such that one defines a larger hole and the second layer defines a smaller hole. In this way a stepped hole with parallel sides can be defined. While this provides an approximation of the preferred hole geometry the parallel sides are a significant compromise for the fluid dynamic properties of the hole and the resist patterning and alignment adds complexity to the process.

Laser drilling provides an alternative method for forming perforate membranes with well controlled distributions of hole sizes in the target size range. Control of the laser power, number of pulses, focal position, and focal length of the final objective allows independent control of the hole size and profile for two or more target hole sizes. This technique offers the choice of a much greater range of materials including many metals, ceramics and polymer materials. Different thicknesses of materials can be selected and the drill parameters adapted to suit the material thickness. This allows decoupling of the holes size, pitch and material thickness compared to the process limitations of electro-forming. This can help the design of the perforate membrane as it allows tuning of the mechanical vibrational behaviour to the preferred frequency of operation and so optimising the resonant behaviour. This control is dominated by the thickness and geometry of the perforate membrane. Material selection also allows perforate membranes to be formed into a domed or other out or plane shape and the combination of formable materials, geometry and material thickness greatly enhance design freedom and optimisation for vibration across a wide area of perforate membrane and so maximising the area with sufficient vibration to generate droplets and so with a suitable hole pattern maximise delivery rate of the chosen droplet sizes.

Using a higher power and larger spot size allows larger holes to be formed and similarly using a lower power and tightly focused small spot size allows small holes to be formed. Drilling a population of two different hole sizes requires switching between the two different drilling parameters. This can be achieved in a number of ways; simply changing the control parameters for a single laser, switching between two laser systems within the same overall drilling instrument, or by drilling the two or more distributions on separate drilling instruments.

The preference between these approaches is largely driven by the target throughput and trade-off between process stability and part handling. Typically having a fixed set of parameters for the different hole size populations is preferred for process stability and consistency so using either two laser light paths in one instrument or using two separate instruments may be preferred.

The invention claimed is:

1. A liquid droplet production apparatus comprising:

a perforate membrane having a domed primary shape; and an actuator configured to vibrate the perforate membrane in a transverse direction such that a liquid in contact with the perforate membrane during use is caused to pass through a plurality of apertures of the perforate membrane and to be ejected as liquid droplets from the perforate membrane, wherein the perforate membrane comprises a plurality of stiffening structures for increasing a stiffness of the perforate membrane, the plurality of stiffening structures each being defined by a local transverse deformation of the perforate membrane which forms an interruption to the domed primary shape of the perforate membrane in the transverse direction;

wherein at least a first set of the plurality of apertures each extend through a thickness of the perforate membrane at an oblique angle to the normal of the domed primary shape at a point at which the aperture is located, and wherein the plurality of stiffening structures is defined by a plurality of elongate local transverse deformations and at least one of the plurality of elongate local transverse deformations includes a major axis that extends in a radial direction of the perforate membrane towards a centroid of the perforate membrane.

2. The liquid droplet production apparatus according to claim 1, wherein the local transverse deformation of at least one of the plurality of stiffening structures comprises an indentation in an outer surface of the domed primary shape.

3. The liquid droplet production apparatus according to claim 1, wherein the perforate membrane comprises a planar portion in which a centroid of the perforate membrane and the plurality of apertures are located.

4. The liquid droplet production apparatus according to claim 1, wherein each of the first set of the plurality of apertures is angled towards a transverse axis of the perforate membrane relative to the normal of the perforate membrane.

5. The liquid droplet production apparatus according to claim 1, wherein the plurality of apertures comprises a first array of apertures of a first configuration and a second array of apertures of a second configuration which is different to the first configuration, wherein the first array of apertures are grouped together in a first discrete region of the perforate membrane, and wherein the second array of apertures are grouped together in a second discrete region of the perforate membrane.

6. The liquid droplet production apparatus according to claim 5, wherein the first discrete region of the perforate membrane has a first vibration characteristic and the second discrete region has a second vibration characteristic which is different to the first vibration characteristic, such that when the perforate membrane is vibrated by the actuator at a first resonant frequency, the first discrete region vibrates with a first amplitude or acceleration and the second discrete region vibrates in phase with the first discrete region with a second amplitude or acceleration which is less than the first amplitude or acceleration.

7. The liquid droplet production apparatus according to claim 6, wherein the second vibration characteristic is such that when the perforate membrane is vibrated by the actuator at a second resonant frequency, the second discrete region vibrates at a third amplitude or acceleration which is less than both of the first amplitude or acceleration and the second amplitude or acceleration.

8. The liquid droplet production apparatus according to claim 7, wherein the apertures of the first array are of a first aperture size and the apertures of the second array are of a second aperture size, wherein preferably the first aperture size is less than the second aperture size.

9. The liquid droplet delivery apparatus according to claim 1, further comprising a reservoir configured to supply a liquid to the perforate membrane for ejection as liquid droplets.

10. The liquid droplet delivery apparatus according to claim 9, wherein the reservoir comprises a first reservoir portion configured to supply a first liquid to a first discrete region of the perforate membrane, a second reservoir portion configured to supply a second liquid to a second discrete region of the perforate membrane, and at least one liquid barrier configured to separate the first and second reservoir portions.

11. A removable cartridge for use in the liquid droplet delivery apparatus of claim 9.

12. A perforate membrane for the liquid droplet production apparatus of claim 1.

13. An actuator assembly for the liquid droplet production apparatus, the actuator assembly comprising the perforate membrane according to claim 12 and an annular actuator, wherein the perforate membrane is coupled to the annular actuator such that the perforate membrane extends across a central opening in the annular actuator.

14. A method of manufacturing a domed primary shape perforate membrane that includes a plurality of apertures for a liquid droplet apparatus, the method comprising the steps of:

placing a perforated sheet material that includes a first set of the plurality of apertures that each extend through a thickness of the perforate membrane at an angle to a normal of the perforate membrane at a point at which the aperture is located in a press; and deforming the perforated sheet material with the press to form the perforate membrane, wherein the step of deforming the sheet material includes forming local transverse deformations in the perforated sheet material that each form an interruption to the domed primary shape of the perforate membrane in a transverse direction to define a plurality of stiffening structures for increasing a stiffness of the perforate membrane, and wherein the plurality of stiffening structures is defined by a plurality of elongate local transverse deformations and at least one of the plurality of elongate local transverse deformations includes a major axis that extends in a radial direction of the perforate membrane towards a centroid of the perforate membrane.

15. The method of manufacturing the perforate membrane according to claim 14, wherein the press includes a male tool comprising a compliant pressing surface and a female tool comprising a mould cavity, and wherein the step of deforming the perforated sheet material comprises deforming the perforated sheet material against the mould cavity of the female tool with the compliant pressing surface of the male tool, the mould cavity comprising at least one surface feature configured to create the local transverse deformations in the perforate membrane.

16. The method of manufacturing the perforate membrane according to claim 15, wherein the compliant pressing surface of the male tool comprises a first clamping portion for clamping a peripheral region of the perforated sheet material against a second clamping portion of the female tool such that the peripheral region of the perforated sheet material is constrained in a lateral direction between the first clamping portion and the second clamping portion during the step of deforming the perforated sheet material.

17. The method of manufacturing the perforate membrane according to claim 16, wherein the first clamping portion and the second clamping portion are planar, such that the step of deforming the perforated sheet material results in the perforate membrane comprising a planar peripheral region.

* * * * *